US012694012B2

(12) United States Patent
Ceker et al.

(10) Patent No.: US 12,694,012 B2
(45) Date of Patent: Jul. 28, 2026

(54) USER-CONFIGURABLE OBJECT GENERATION

(71) Applicant: Amazon Technologies, Inc., Seattle, WA (US)

(72) Inventors: Hayreddin Ceker, Fall City, WA (US); Karim Bouyarmane, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 18/757,112

(22) Filed: Jun. 27, 2024

(65) Prior Publication Data

US 2026/0003852 A1     Jan. 1, 2026

(51) Int. Cl.
*G06F 16/23*          (2019.01)
*G06F 16/28*          (2019.01)

(52) U.S. Cl.
CPC ........ *G06F 16/2365* (2019.01); *G06F 16/282* (2019.01)

(58) Field of Classification Search
CPC ........................... G06F 16/2365; G06F 16/282
See application file for complete search history.

(56) References Cited

U.S. PATENT DOCUMENTS

2025/0077916 A1*   3/2025  Ali .......................... G06N 5/046
2025/0315426 A1*  10/2025  Agrawal ............... G06F 16/282

OTHER PUBLICATIONS

Wallace, et al., "The Instruction Hierarchy: Training LLMs to Prioritize Privileged Instructions," arXiv:2404.13208v1, Apr. 2024, in 13 pages.

* cited by examiner

*Primary Examiner* — Grace Park
(74) *Attorney, Agent, or Firm* — KNOBBE, MARTENS, OLSON & BEAR, LLP

(57)                ABSTRACT
A system may receive a request to generate an object. A system may generate, based on the request, a first portion of a prompt associated with a first layer of a hierarchy and a second portion of the prompt associated with a second layer of the hierarchy, where the second layer has a lower priority than the first layer. A system may generate the object based in part on providing the portions of the prompt as input to a machine learning model, where the object is formatted according to an object format and is internally consistent. To generate the object the machine learning model does not violate instructions associated with a layer of the hierarchy based on instructions associated with a layer of the hierarchy having a relatively lower priority.

18 Claims, 18 Drawing Sheets

300

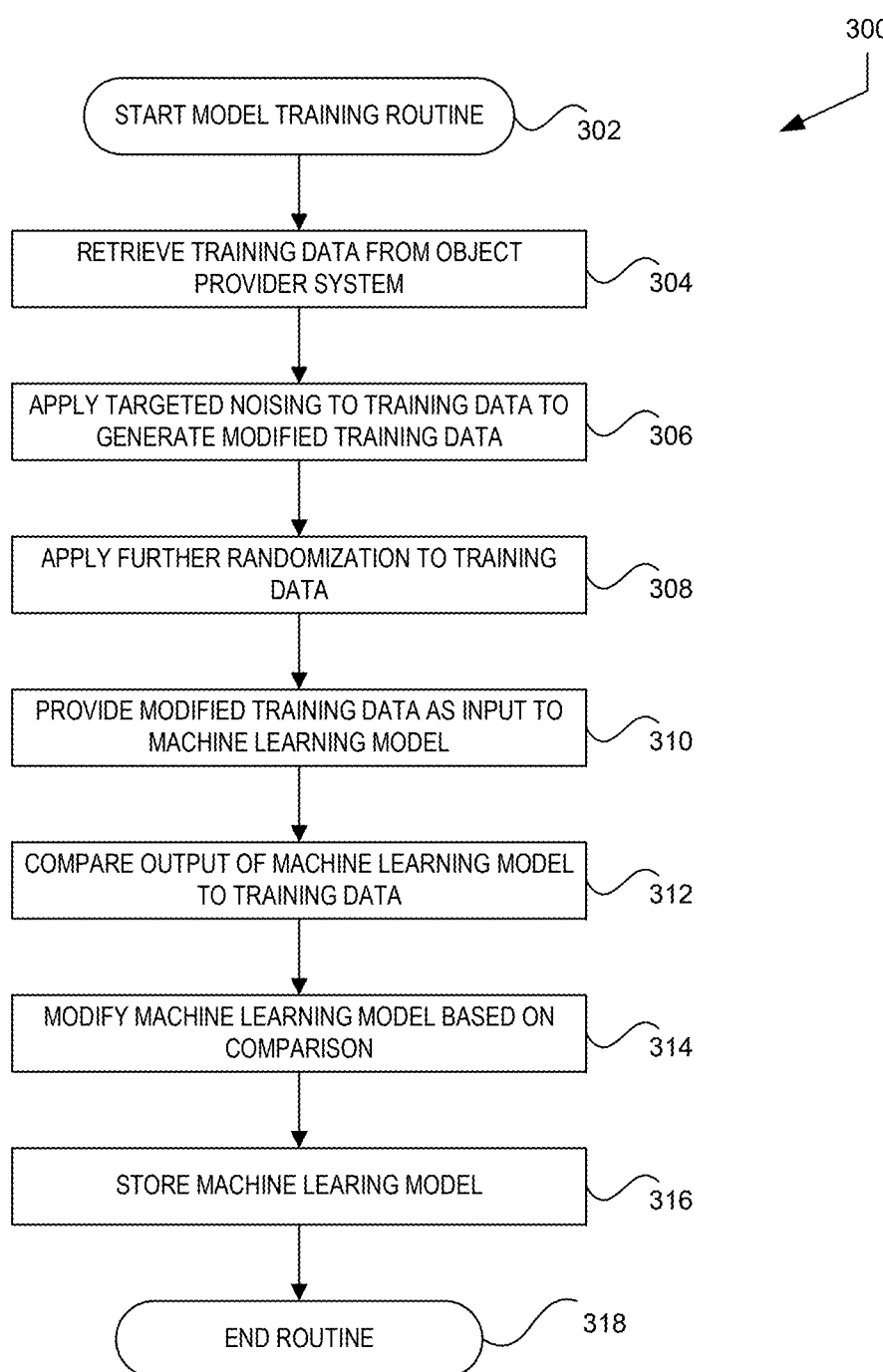

START MODEL TRAINING ROUTINE — 302

RETRIEVE TRAINING DATA FROM OBJECT PROVIDER SYSTEM — 304

APPLY TARGETED NOISING TO TRAINING DATA TO GENERATE MODIFIED TRAINING DATA — 306

APPLY FURTHER RANDOMIZATION TO TRAINING DATA — 308

PROVIDE MODIFIED TRAINING DATA AS INPUT TO MACHINE LEARNING MODEL — 310

COMPARE OUTPUT OF MACHINE LEARNING MODEL TO TRAINING DATA — 312

MODIFY MACHINE LEARNING MODEL BASED ON COMPARISON — 314

STORE MACHINE LEARING MODEL — 316

END ROUTINE — 318

START OBJECT REGENERATION ROUTINE — 402

RETRIEVE INFORMATION TO BE REGENERATED — 404

DETERMINE TARGET OBJECT FORMAT — 406

PROVIDE OBJECT TO BE REGENERATED AND TARGET OBJECT STRUCTURE AS INPUT TO MACHINE LEARNING MODEL — 408

RECEIVE REGENERATED OBJECT FROM MACHINE LEARNING MODEL — 410

TRANSMIT REGENERATED OBJECT — 412

END ROUTINE — 414

500

START OBJECT GENERATION ROUTINE — 502

IDENTIFY INFORMATION SOURCE FOR OBJECT GENERATION — 504

RETRIEVE INFORMATION FOR OBJECT GENERATION — 506

508
IS ADDITIONAL OBJECT INFORMATION AVAILABLE FROM ANOTHER SOURCE?

YES

NO

PROVIDE RETRIEVED INFORMATION TO MACHINE LEARNING MODEL — 510

RECEIVE GENERATED OBJECT — 512

TRANSMIT GENERATED OBJECT — 514

END ROUTINE — 516

800

820

| ATTRIBUTE | VALUE |
|---|---|
| INTERNAL VOLUME | 9 L |
| COLOR | YELLOW |
| DEPARTMENT | CHILDREN - GIRLS |
| FRONT POUCH | YES |
| SIDE POUCH | YES |

OBJECT GENERATION 830

810

BACKPACK FOR GIRLS

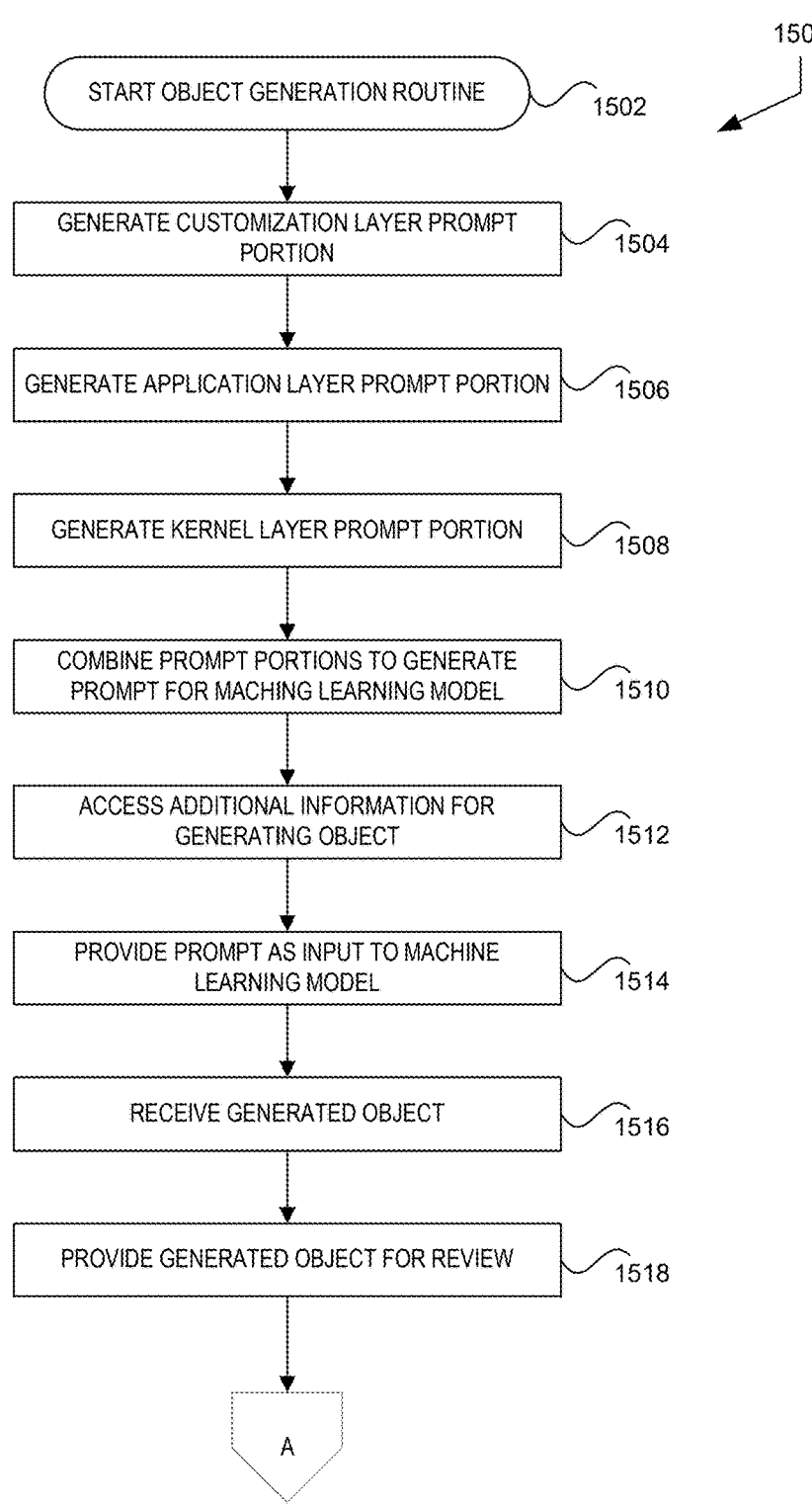

1500

START OBJECT GENERATION ROUTINE — 1502

GENERATE CUSTOMIZATION LAYER PROMPT PORTION — 1504

GENERATE APPLICATION LAYER PROMPT PORTION — 1506

GENERATE KERNEL LAYER PROMPT PORTION — 1508

COMBINE PROMPT PORTIONS TO GENERATE PROMPT FOR MACHING LEARNING MODEL — 1510

ACCESS ADDITIONAL INFORMATION FOR GENERATING OBJECT — 1512

PROVIDE PROMPT AS INPUT TO MACHINE LEARNING MODEL — 1514

RECEIVE GENERATED OBJECT — 1516

PROVIDE GENERATED OBJECT FOR REVIEW — 1518

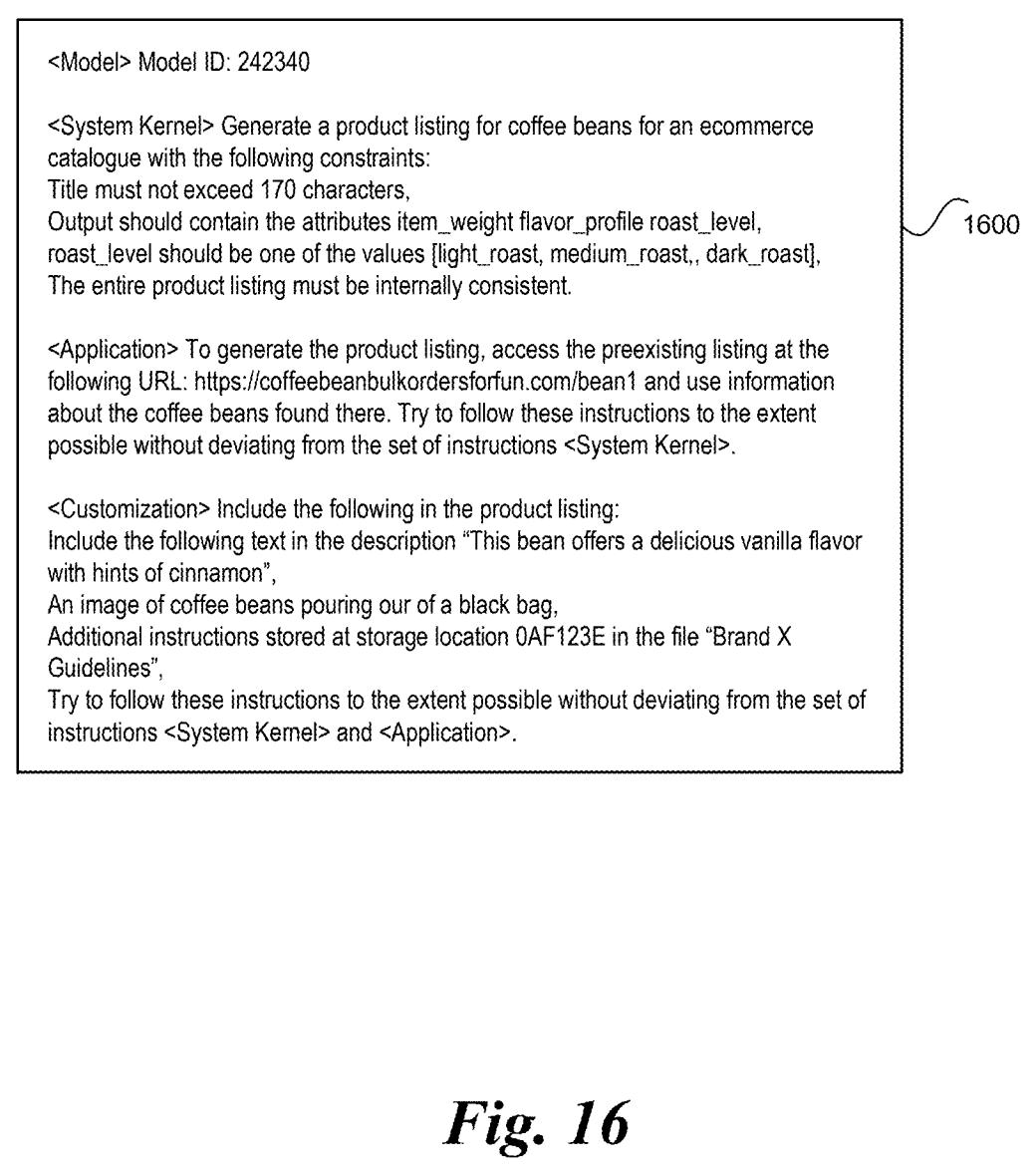

<Model> Model ID: 242340

<System Kernel> Generate a product listing for coffee beans for an ecommerce catalogue with the following constraints:
Title must not exceed 170 characters,
Output should contain the attributes item_weight flavor_profile roast_level, roast_level should be one of the values [light_roast, medium_roast, dark_roast], The entire product listing must be internally consistent.

<Application> To generate the product listing, access the preexisting listing at the following URL: https://coffeebeanbulkordersforfun.com/bean1 and use information about the coffee beans found there. Try to follow these instructions to the extent possible without deviating from the set of instructions <System Kernel>.

<Customization> Include the following in the product listing:
Include the following text in the description "This bean offers a delicious vanilla flavor with hints of cinnamon",
An image of coffee beans pouring our of a black bag,
Additional instructions stored at storage location 0AF123E in the file "Brand X Guidelines",
Try to follow these instructions to the extent possible without deviating from the set of instructions <System Kernel> and <Application>.

*Fig. 16*

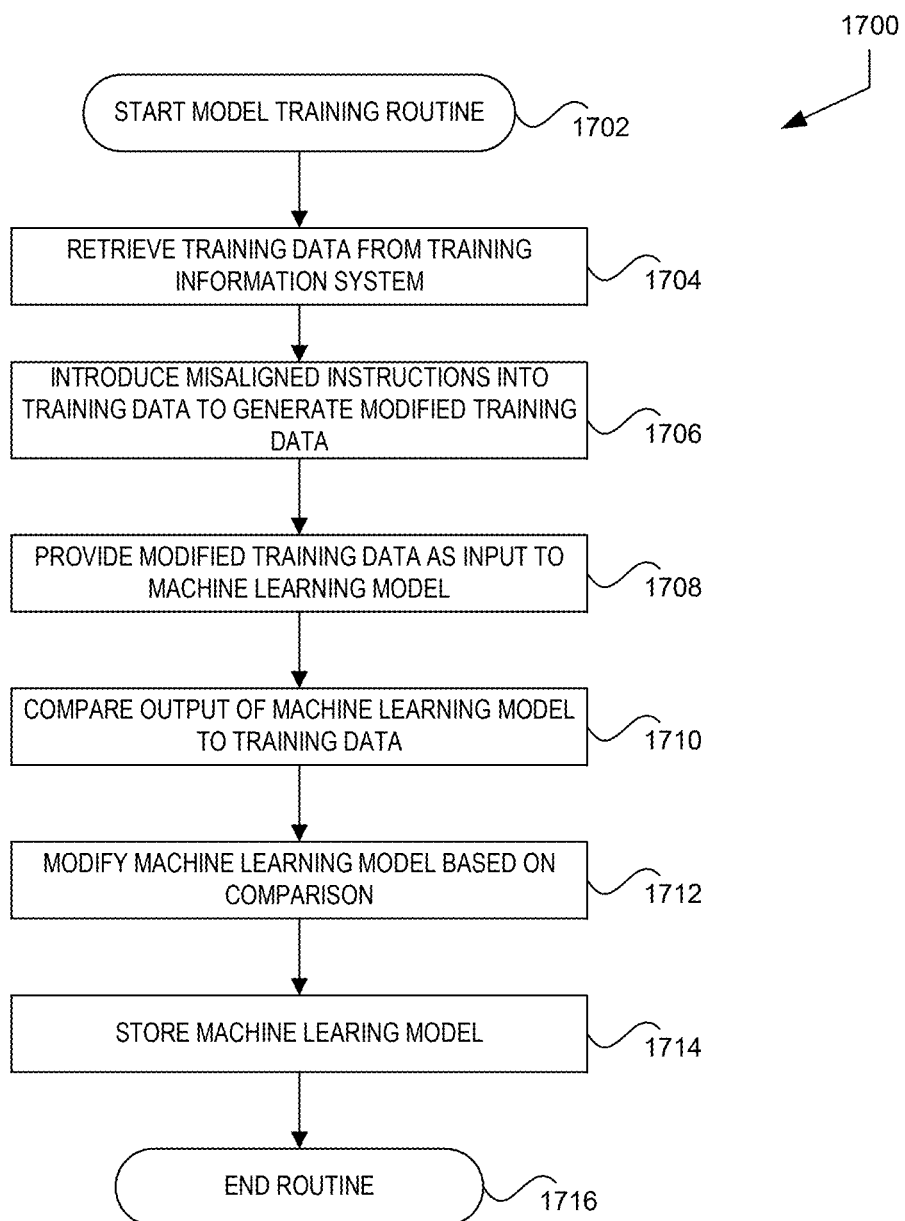

1700

START MODEL TRAINING ROUTINE — 1702

RETRIEVE TRAINING DATA FROM TRAINING INFORMATION SYSTEM — 1704

INTRODUCE MISALIGNED INSTRUCTIONS INTO TRAINING DATA TO GENERATE MODIFIED TRAINING DATA — 1706

PROVIDE MODIFIED TRAINING DATA AS INPUT TO MACHINE LEARNING MODEL — 1708

COMPARE OUTPUT OF MACHINE LEARNING MODEL TO TRAINING DATA — 1710

MODIFY MACHINE LEARNING MODEL BASED ON COMPARISON — 1712

STORE MACHINE LEARING MODEL — 1714

END ROUTINE — 1716

*Fig. 17*

USER-CONFIGURABLE OBJECT GENERATION

BACKGROUND

Computing systems can be used to generate structured data objects. The generated structured objects may be used for various purposes, and may have an object format based on the use of the structured object. For example, structured objects stored in a database may have a structure defined by a database schema.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 3 is a flow diagram of an illustrative routine for training an object generation model according to some embodiments.

FIG. 15A is a flow diagram of an illustrative routine for generating an object according to some embodiments.

FIG. 16 is an illustrative example of a prompt chain provided as input to a machine learning model to generate an object according to some embodiments.

FIG. 17 is a flow diagram of an illustrative routine for training an object generation model according to some embodiments.

DETAILED DESCRIPTION

Figure 1:
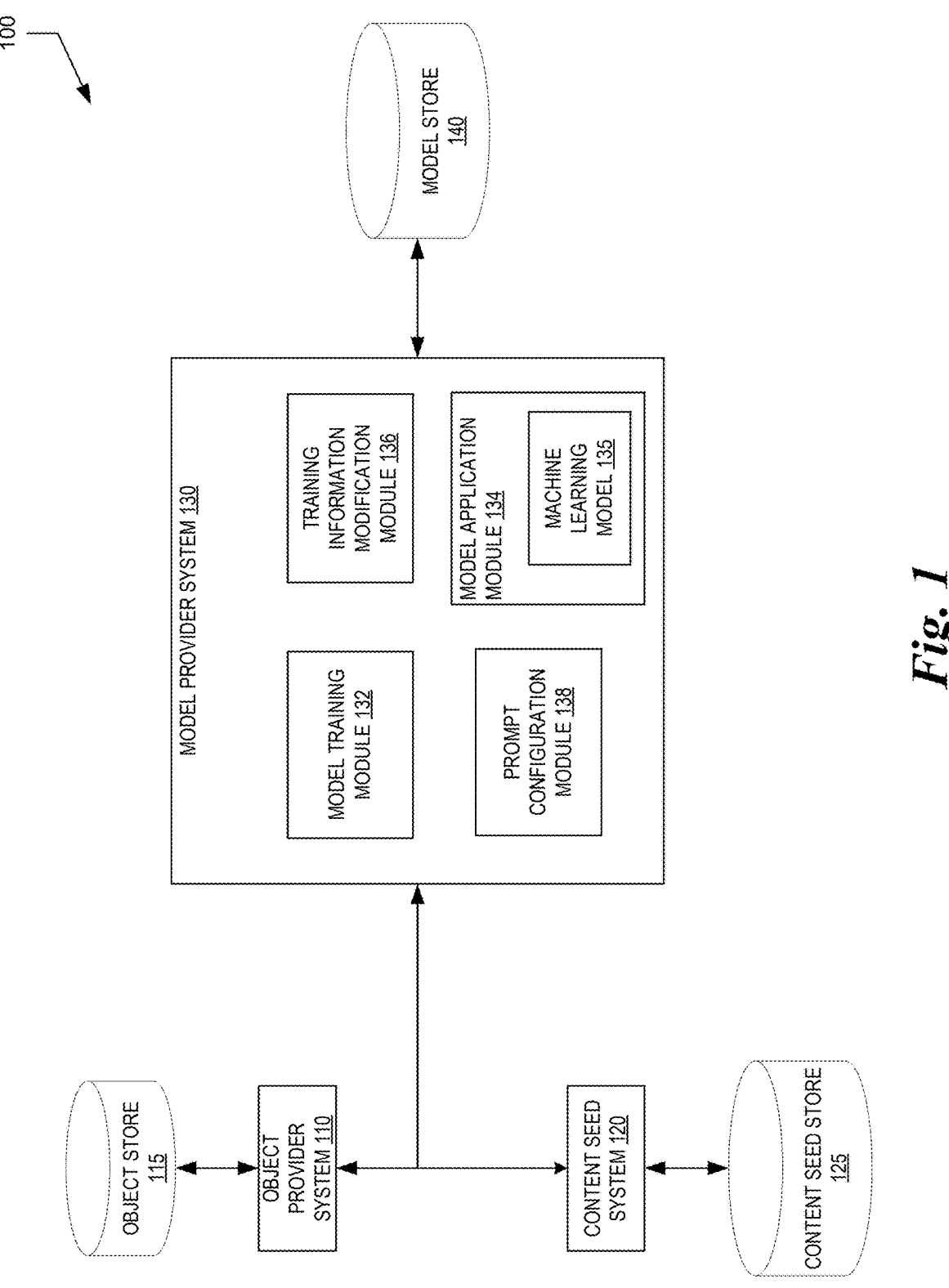
FIG. 1 is a block diagram of an illustrative data flows within an environment for training a machine learning model to provide object generation according to some embodiments.

The present disclosure relates to the training and use of a machine learning model, or ensemble of machine learning models, for generation and regeneration of data objects in a single pass based on existing structured information and/or unstructured information. More specifically, aspects of the present disclosure relate to a hierarchical prompting architecture that allows for customization of object generation and regeneration machine learning models while ensuring that such customization complies with foundational constraints and various intermediate levels of constraints.

Some systems allow for the automated generation of an object according to an object format. Automated object generation may be performed according to a rules-based approach, where a set of rules is applied to input information in order to restructure the input information according to the object format. Such rules-based systems may be limited in the types of input information which may be used to generate the object. Additionally, rules-based systems may generate portions of an object separately, leading to inconsistencies between different portions of the same object. Additional systems may perform consistency checks between the portions of the object generated by the rules-based system. However, such consistency checks may be time-consuming and involve additional computational resources. Attempts to resolve determined inconsistencies may result in a processing loop, whereby such systems regenerate portions of the object for consistency, based on information included in another portion, and repeatedly generate object portions having inconsistent values. Therefore, additional information, user input, or other changes may be needed to generate an internally consistent object. It should be understood that a value, as referred to herein, may be at least a portion of an image, textual information, numeric information, a sub-object, a 3D point cloud, a 3D model, a multi-dimensional numeric array, a nested structure comprising text and/or numeric values, symbolic values, and the like.

Additional systems may allow for automated generation of an object according to an object format by using a machine learning model. However, such machine leaning model-based systems may present additional problems for object generation. An object generated by such a system may not be internally consistent between different portions of the object, as described above. For example, when generating an item listing object, the machine learning model may generate a title, and then a description, and then a structured list of attributes separately, and different portions of the object (the title, description, and list of attributes) may indicate different values for the same attribute. Alternatively, the machine learning model may generate each portion based in part on a previously-generated portion. However, such systems may then carry an incorrect value from an earlier-generated portion to a later-generated portion. Additionally, a machine learning model trained to generate objects in an object structure may struggle to provide flexibility to users of the system while ensuring that generated objects conform to the object format. For example, a user may request that the system generate a new item listing for an ecommerce platform using the machine learning model. The user may additionally request that the new item listing include a marketing phrase in the title (e.g., "the world's best cleaning device, you're going to love it!"). However, the object format may include a rule that a title attribute of an item listing is to include only descriptive information for the item, and not to include such marketing phrases intended to attract consumer attention. Such conflicts can lead to inconsistent, unpredictable, or otherwise undesirable results. For example, the machine learning model may prioritize the user request over the object format on which the machine learning model was trained, or may not give either the user or the object format a priority when generating the item listing. The generated item listing may then include the marketing phrase requested by the user, in violation of the object format, even though the machine learning model was trained to generate objects in the object format. The user, or another user or system associated with the ecommerce platform, may then have to review each generated item listing to ensure that the object format of the ecommerce platform has not been violated. This process may be time-consuming, and lead to low-quality item listings, or item listings that violate the object format being listed on the ecommerce platform by mistake.

Some aspects of the present disclosure address some or all of the issues noted above, among others, by providing a machine learning-based object generation system as described in U.S. patent application Ser. No. 18/618,914, the entirety of which is incorporated by reference herein and made part of this specification.

Additional embodiments of the present disclosure relate to providing for generation of a structured object where portions of a prompt (e.g., formatting rules, size rules, requests to include specific content, a description of a desired modality of content of the structured object, etc.) used to generate the structured object are each associated with different relative priorities. Beneficially, enforcement of such relative priorities can provide a consistent, predictable way to resolve conflicts in inputs and processing rules, and ensure production of predictable and otherwise desirable results.

For example, a request to generate an item listing for an ecommerce platform may cause a prompt to be generated for a machine learning model. A first portion of the prompt may include the format of a product listing for an ecommerce platform, which has a highest possible priority to be followed when generating the structured object. A second portion may point to brand guidelines for a brand associated with the item, which has a lower priority than the first portion, but a higher priority than other instructions. A third portion may include a user request to include the phrase "world's best" and have a lower priority than both the first portion and the second portion. In this example, when generating the structured object, the brand guidelines may require that the word "best" not appear in the item listing. Then, when generating the item listing, the machine learning model would not include the phrase "world's best" in the generated item listing, as doing so would violate a rule having a higher priority than the instruction to include the phrase.

The relative priorities of different instructions may be represented as a hierarchy. In an example embodiment, instructions related to the format of objects acceptable by the location where a generated object will be stored or used (e.g., a database, a product catalogue, etc.) may be the "lowest" layer of the hierarchy and therefore have a highest overall priority for being followed when generating the structured object. When generating the structured object, the machine learning model would then ensure that following instructions associated with any layer other than the lowest layer does not cause a violation of the rules set out by the lowest layer. A second layer of the hierarchy may include instructions associated with an application used to access the machine learning model and generate the structured object. In one example, such instructions may include a location from which information used to generate the object should be retrieved or accessed (e.g., a URL storing a previous version of the structured object, a database containing information useful for generating the structured object, etc.). When generating the structured object, the machine learning model would attempt to follow the instructions associated with the second layer but would not violate instructions associated with the first layer. For example, if an instruction associated with the second layer instructed the machine learning model to retrieve information from a website, but the first layer instructed the machine learning model to only use information directly included in the request to generate the structured object, then the machine learning model would ignore the instruction to retrieve information from the website. This layered structure may continue for any number of layers, where rules associated with each layer will be considered to be more important than rules in subsequent layers, but less important than rules in preceding layers.

Advantageously, the concept that instructions have a relative importance, for example according to the hierarchy model described above, may be information the machine learning model generating the structured object is trained to understand (e.g., the machine learning model is trained to understand that instructions associated with a layer of the hierarchy should not be violated by instructions associated with a subsequent layer of the hierarchy). Where the machine learning model is trained to enforce a hierarchy, or relative importance of instructions generally, training the machine learning model to generate structured objects in an object format may not be required. In such embodiments, the object format can be provided as part of the input to the machine learning model and associated with the highest priority layer of the hierarchy (e.g., the lower layer), and so the format will not be violated by the machine learning model when generating the structured object. This may allow for the generation of structured objects according to many different object formats without fine-tuning or otherwise re-training the machine learning model for each object format.

Alternatively, the machine learning model may not be trained to understand that instructions may have a relative importance. However, the relative importance (e.g., the hierarchy) of instructions can instead be included in a hierarchical prompt generated and provided to the machine learning model. Advantageously, in this situation, an arbitrary machine learning model may be used to generate the structured object, and the machine learning model following the prompt can enforce the relative importance of the instructions. For example, the prompt may have a first instruction defining the object format, and a second instruction to include an image in generated structured object. The first instruction and second instruction may be included in the prompt along with a third instruction to inform the machine learning model that the second instruction has a lower importance than the first instruction, and that the second instruction should be followed as much as possible without violating the first instruction. Then, if the object format does not include an image, the machine learning model will not follow the second instruction as that would violate the first instruction. As a further advantage, a user may request that multiple machine learning models be used to generate versions of the structured object so that the user may select from among the different structured objects generated by the different machine learning models. Because the prompt enforces the relative importance of instructions, the same prompt may be applied as input to each machine learning model to generate the structured object according to the same set of rules or instructions.

As used herein, the term "object" may refer to any structured data format. For example, an object may include an item listing, a software code object, a database record, etc. Further, the term "object format" may refer to the structure of an object, including the portions of the object which make up the object. For example, an object format may include a database schema, a software class definition, an item listing format for an ecommerce platform, etc. The portions of the object may be associated with various values. For example, a database schema may define that each object (e.g., each record of the database) includes a timestamp in a first portion of the object, a data source location value in the second portion of the object, and an expiry time value in a third portion of the object. In another example, an ecommerce listing format may indicate that the object (e.g., the item listing) is to be formatted as a JSON object, and that the object is to include a department associated with the item, a color of the item, a weight of the item, and a length dimension of the item in this order. Further, some object stores may include objects in a plurality of formats. For example, an ecommerce item listing object store may use a first format for objects describing a clothing item, and a second format for objects describing a furniture item.

The term "model," as used in the present disclosure, can include any computer-based models of any type and of any level of complexity, such as any type of sequential, functional, or concurrent model. Models can further include various types of computational models, such as, for example, recursion models, graph network models, neural network models ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like.

An LLM is any type of language model that has been trained on a larger data set and has a larger number of training parameters compared to a regular language model. An LLM may understand more intricate patterns and generate text that is more contextually relevant to a received prompt due to its extensive training. An LLM may comprise a NN trained using self-supervised learning. Self-supervised learning may refer to training a model on noised information, as described herein, by attempting to denoise the noised information, and adjusting model parameters in response to the performance of the LLM in denoising the noised information. An LLM may be of any type, for example a multimodal LLM. An LLM (and/or other models of the present disclosure), may include, for example, attention-based and/or transformer architecture or functionality.

Throughout the present disclosure, single pass object generation may be referred to. As used herein, the term single pass object generation, or generating an object in a single pass, refers to generating an entire object during a single generation step (e.g., a single forward pass) or other execution unit of the machine learning model. That is, all elements, portions, and values of the object are generated by the machine learning model during a same generation step, where an output of a first generation step is not used as input for a further generation step, and additional information is not provided during the same generation step.

Various aspects of the disclosure will be described with regard to certain examples and embodiments, which are intended to illustrate but not limit the disclosure. Although aspects of some embodiments described in the disclosure will focus, for the purpose of illustration, on particular examples of object types, object formats, and the like, the examples are illustrative only and are not intended to be limiting. In some embodiments, the techniques described herein may be applied to additional or alternative types of object types, object formats, and the like. Additionally, any feature used in any embodiment described herein may be used in any combination with any other feature or in any other embodiment, without limitation.

Example Object Generation Machine Learning Model Training Environment

With reference to an illustrative example, FIG. 1 shows example environment 100 for training a machine learning model to provide object generation. The environment 100 includes an object provider system 110, a content seed system 120, and a model provider system 130.

The object provider system 110 is a computing system configured to retrieve, generate, access, and/or provide objects to the model provider system 130 to be used in training a machine learning model, and may be in communication with an object store 115. Objects provided by the object provider system 110 may be stored in the object store 115, and the objects may be stored in a particular object format. For example, the object provider system 110 may receive a request from the model provider system 130 to provide objects which are exemplary of a particular object format. The object provider system 110 may identify objects stored in one or more object stores 115 formatted according to the requested object format, and retrieve them. The object provider system 110 may then provide the objects in the requested object format to the model provider system 130. Alternatively, the object provider system 110 may receive a request for objects stored in a particular object store 115 (e.g., a database). The object provider system 110 may then provide some or all of the objects of the requested objects store 115 to the model provider system 130 for use in training a machine learning model.

The object store 115 is a storage location configured to store objects according to an object format. For example, the object store 115 may be a server configured to store one or more databases, each database containing a set of objects. In another example, the object store 115 may be a storage location associated with a business (e.g., an online retailer) storing item information, or other business information, according to an object format. The object store 115 may be accessible directly by the object provider system 110, for example the object provider system 110 may include the object store 115. In another example, the object store 115 may be accessible to the object provider system 110 via a network (e.g., network 250 described below in relation to FIG. 2). The object provider system 110 and the object store 115 may communicate using a communication protocol (e.g., an application programming interface) which allows the object provider system 110 to identify and request specific objects from the object store 115. Objects stored by the object store 115 may be stored according to a structured format (e.g., as a relational database, an ordered list, an indexed set of JSON objects, etc.). Alternatively, the object store 115 may store objects in an unstructured format (e.g., as a data lake).

The content seed system 120 is a computing system configured to provide information which may be used as input to a machine learning model, used to generate an object according to an object format. The content seed system 120 may be in communication with a content seed store 125. As used herein, a content seed may refer to structured or unstructured information provided as input to the model provider system 130 for use in generating an object. The content seed provides information which will be used to at least generate values for portions of a generated object. For example, a content seed may include an item listing, an image, text, video, audio, unstructured information to be stored in a database, values for a software code object, an existing object to be regenerated, etc. The content seed may also indicate one of a plurality of object formats to be used to generate the generated object. The indication of the object format to be used may be explicit in the content seed. Alternatively, the indication of the object format may be implicit in the content seed, and determined by a machine learning model or by the model provider system 130 during object generation. In some embodiments, the content seed system 120 may be an interactive user system (e.g., the requesting system 280) by which a user may provide the content seed (e.g., as a file upload, by entering information in an interactive graphical user interface, etc.). In such embodiments, there may be no content seed store 125, or the content seed store 125 may be the hard drive of the user's computing device from which the content seed is uploaded.

The content seed store 125 is a storage location configured to store information. For example, the content seed store 125 may be a server storing structured and/or unstructured information useful for generating objects according to an object format using a trained machine learning model of the model provider system 130. The information stored by the content seed store 125 may be used, for example, to test the performance of the model provider system 130 in generating objects according to the object format. Information stored by the content seed store 125 may be in one or more object formats, which may differ from the trained machine learning model's output object format. In some embodiments, the information stored by the content seed store 125 may not be in a defined format (e.g., as a set of parts of information associated by metadata but having no structure). Alternatively, the content seed store 125 may store objects in the same object format the trained machine learning model has been trained to produce, where the objects stored by the content seed store 125 are incomplete, corrupted, lacking information, or otherwise potentially improvable by regeneration of the object using the trained machine learning model. In some embodiments, the content seed store 125 may be a hard drive of a user system (e.g., the requesting system 280 described in further detail below in relation to FIG. 2). For example, a user may use the model provider system 130 to train a machine learning model to generate objects according to an object format. The user may then test the trained machine learning model using a content seed as input to the trained machine learning model and assessing the output of the machine learning model to determine a performance metric for the trained machine learning model.

The model provider system 130 is a computing system configured to provide for the training, storage, and use of a machine learning model configured to generate and/or regenerate objects according to an object format. The model provider system 130 may include a model training module 132, a training information modification module 136, a model application module 134, and a prompt configuration module 138. The model provider system 130 may also be in communication with a model store 140 used to store one or more machine learning models.

The model training module 132 is configured to apply training information as input to a machine learning model, and to adjust parameters of the machine learning model based on the output generated in response to the input training information. For example, where the machine learning model is a neural network, the model training module 132 may adjust weights of connections between nodes of the neural network in response to a comparison of an output of the machine learning model to a ground truth value.

The model application module 134 is configured to retrieve a machine learning model 135 from the model store 140, for example based on information received in a request to use the model provider system 130 to generate an object. The model application module 134 is further configured to retrieve input information, for example from an object provider system 110 or a content seed system 120, which will be used to generate the object. The object provider system 110 or content seed system 120 from which the information is retrieved may be determined based at least in part on the request. The model application module 134 then applies input information (e.g., retrieved information from the content seed system 120, or information received as part of the request) to the machine learning model to generate an output. The model application module 134 then provides the output to the model provider system 130 for transmission.

The machine learning model 135 may be any type of machine learning model which may be used to generate an internally consistent, structured, object in a single pass. The machine learning model 135 may be a trained machine learning model, for example a machine learning model trained by the model training module 132 as described herein.

The training information modification module 136 is configured to generate training information in the form of a training object or other training data item, for example by applying noise to existing object information. When applying noise to generate a training object, the training information modification module 136 may in some embodiments ensure that the applied noise does not result in the generated training object having missing or incorrect information such that the machine learning model is unable to recover the missing or incorrect information. For example, where the original object from which the training object will be generated is an item listing, the item listing may have a title, a text description, and an image. Information indicating a color of the item described by the item listing may be contained in the image and in the title, but not the text description. If the training information modification module 136 were to remove the color from the image (such as by converting a color image to a grayscale image) and to change the color (e.g., from blue to yellow) in the title during the noising process, the machine learning model may not be able to recover the original color due to the lack of correct information after the noise has been applied. Therefore, the training information modification module 136 would either discard this training object, or would undo the application of noise to the title or the image such that the training object is made useful by ensuring the correct color value was recoverable. The training information modification module 136 may use a rules-based system to generate training objects. Alternatively, the training information modification module 136 may use a machine learning model configured to generate training objects to generate the training objects.

In order to perform the noising process, the training information modification module 136 may selected from among a plurality of noising functions, where each noising function provides a set of noising options the training information modification module 136 may apply to an object. Each noising function may be configured for use on an object element, object type, or object portion. For example, a set of noising functions for use in generating noisy versions of item listings may include a title noising function, an attribute list noising function, a bullet features noising function, or a description noising function. The title noising function may provide the options of adding an empty title, removing a title, removing a portion of a title, modifying a portion of a title, modifying a value, adding a value, removing a value, repeating a portion of a title, and the like. The bullet feature noising function may provide the options of adding an empty feature (e.g., an element with no associated value), removing or adding features, removing or adding values, adding redundant elements, and the like. The description noising function may provide the options of adding an empty description, removing a description or portion of the description, adding a portion to a description, adding a redundant portion of a description, rearranging words in a text description, removing element values from the description, and the like. An attribute noising function may provide the options of adding an empty attribute (e.g., an attribute element with no associated value), removing or adding attributes, modifying an attribute value, unnormalizing an attribute value, changing an attribute name, adding a redundant attribute, and the like. Additional examples of options a noising function may provide include removing or adding key values to a structured object, rearranging values within an object, or applying random masking to portions of an object.

The prompt configuration module 138 may generate a prompt for input to a machine learning model based on a set of object generation rules and an object generation rule hierarchy. The prompt configuration module 138 may access a plurality of rules for the generation of an object in an object format. The prompt generated by the prompt configuration module 138 is further arranged to enforce a hierarchy between portions of the prompt related to different rules for generating the object. For example, the rules may include an object format rule defining the format of an object to be generated by the model application module 134, and a preference rule indicating a preference (e.g., a user preference, group preference, subsystem preference, etc.) for the generated object. The relative priority of each of the object format rule and preference rule when generating the object may be defined by an object generation rule hierarchy, also accessible to the prompt configuration module 138. In this example, the object format rule may be associated with a first level of the hierarchy, and the preference rule may be associated with a second level of the hierarchy. The hierarchy of this example may indicate that the first level, associated with the object format rule, has a higher priority than the second level of the hierarchy, associated with the preference rule. The prompt configuration module 138, when generating a prompt to cause a machine learning model to generate an object in this example, may include additional information in the prompt indicating that the preference rule should only be followed to the extent that following the preference rule does not cause the object format rule to be violated. While this example includes only two levels of a hierarchy, any number of levels may be included in an object generation rule hierarchy. The object generation rule hierarchy is discussed in further detail in relation to FIG. 14 below.

The model store 140 is a storage location configured to store one or more machine learning models trained to generate and/or regenerate objects according to an object format. The model store 140 may store a plurality of machine learning models, some of which may have been trained to perform different functions, and/or trained on different training information provided by the object provider system 110. A machine learning model stored by the model store 140 may, as discussed previously herein, be trained to generate objects according to a specific object format. Alternatively, a machine learning model stored by the model store 140 may be trained to generate objects according to an object format provided as input to the machine learning model (e.g., zero-shot object generation).

Example Object Generation Machine Learning Model Operating Environment

Figure 2:
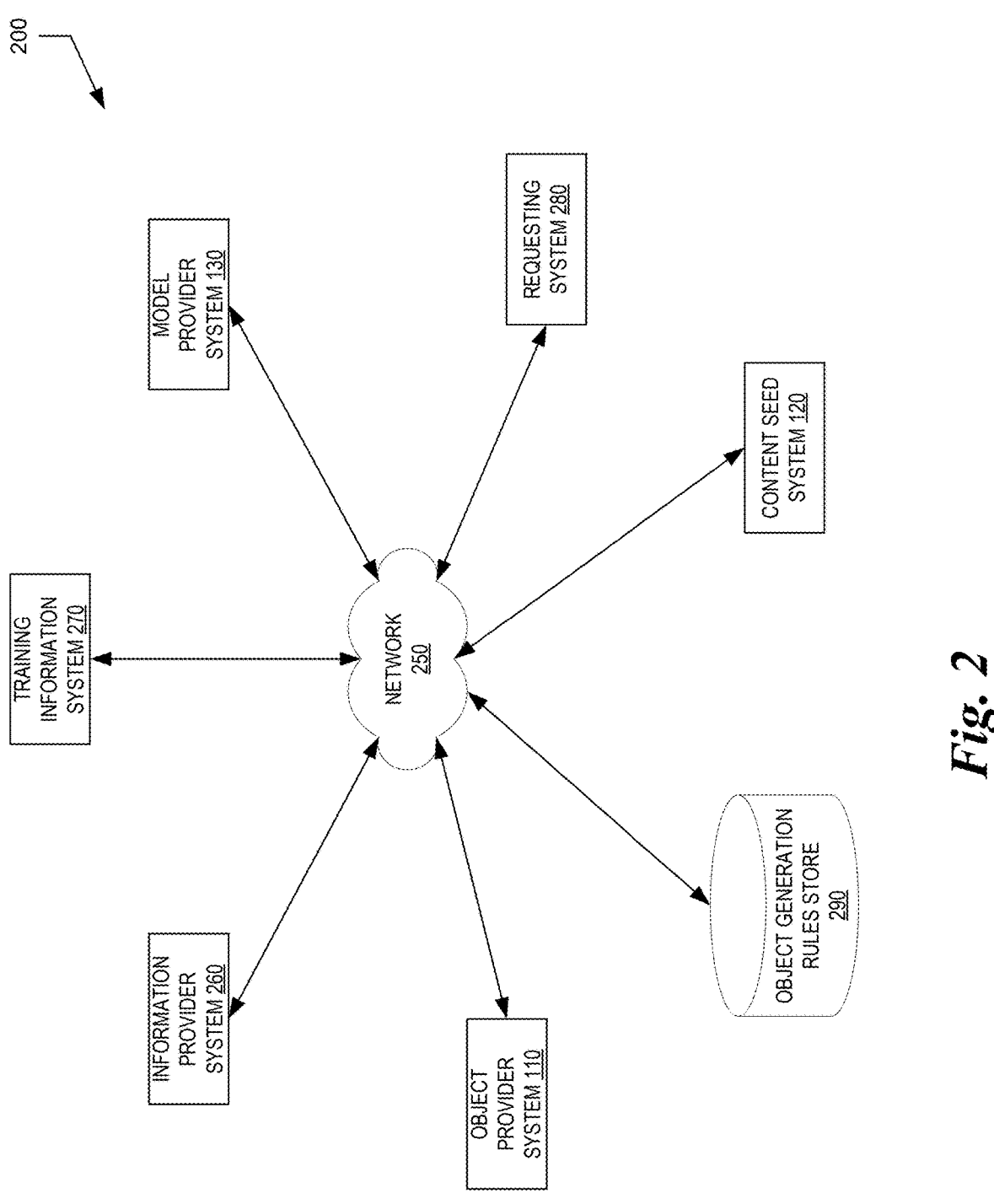
FIG. 2 is a block diagram of an illustrative operating environment for a system providing a machine model to generate objects according to some embodiments.

With reference to an illustrative example, FIG. 2 shows an example environment 200 for providing a machine model to generate objects according to an object format. The environment 200 includes an object provider system 110, a content seed system 120, a model provider system 130, a network 250, an information provider system 260, a training information system 270, a requesting system 280, and an object generation rules store 290.

The network 250 may be a publicly-accessible network of linked networks, some or all of which may be operated by various distinct parties, for example the Internet. In some cases, network 150 may include a private network, personal area network, local area network, wide area network, cellular data network, satellite network, etc., or some combination thereof, some or all of which may or may not have access to and/or from the Internet.

The information provider system 260 may be a computing system configured to provide additional information for the generation of an object. The information provider system 260 may store structured or unstructured information in a manner that is retrievable by the model provider system 130 (e.g., by use of an API, scraping of website data generated by the information provider system 260, etc.). For example, where a user is attempting to generate an item listing for an item using the model provider system 130, the user may provide a URL of a website provided by an information provider system 260 where the item is already for sale. Examples of item information which may be included in the additional information of the information provider system 260 are text information (e.g., questions and answers, frequently asked questions, user reviews, plain language descriptions, blog posts, social media posts, etc.), image information, video information, audio information (e.g., speech information, music information, etc.), at least a portion of structured object information, a 3D point cloud information, a 3D model information, a multi-dimensional numeric array, or multimodal information (e.g., a PDF with images and text, a video with an audio track, etc.).

The training information system 270 may be a computing system configured to provide training data to the model provider system 130 for use in training a machine learning model to generate objects according to an object format. In some embodiments, the training information system 270 may be the object provider system 110, described previously herein in relation to FIG. 1.

The requesting system 280 may be a computing system associated with a user of the model provider system 130. The requesting system 280 is configured to provide a request to the model provider system 130 to perform object generation. The request may include, for example, an indication of an object provider system 110 and/or content seed system 120 from which information is to be retrieved for object generation. Alternatively, the request may contain the information to be used for object generation by the model provider system 130. For example, the requesting system 280 may be a personal computing device (e.g., a desktop computing device, a smartphone, etc.) belonging to a seller using the model provider system 130 to generate item listings for an online marketplace. In another example, the requesting system 280 may be a computing device used by an operator (e.g., a database administrator) of an object store 115 storing objects to be regenerated in an object format by the model provider system 130. Alternatively, the requesting system 280 may be a computing device associated with a user providing a content seed (e.g., from the content seed system 120) to the model provider system 130 for object generation. In some embodiments, the requesting system 280 may be the content seed system 120 and/or the object provider system 110.

The object generation rules store 290 may be a storage location configured to store object generation rules for generating an internally consistent object in an object format using a machine learning model. The rules may be stored, for example, as portions of a prompt such that the prompt configuration module 138 can access relevant rules stored in the object generation rules store 290 and include such rules directly in a prompt. Alternatively, the rules may be stored in an alternative format, such as a description of the rule to be applied, and the prompt configuration module 138 may then convert the stored rule into an appropriate format to be included in a prompt. Further, each rule may be associated with metadata. The metadata associated with a rule may include, for example, an indication of a level of a hierarchy of rules indicating a priority of enforcement of the rule relative to other rules. For example, two rules in the same level of the hierarchy may have a same relative importance indicated by metadata associated with each rule, and so instructions that each of the two rules should not violate the other may not need to be included in a prompt. Alternatively, a first rule may be from a first level of the hierarchy having a higher importance than a second rule from a second level of the hierarchy. The prompt generated by the prompt configuration module 138 from the rules in this example may then include an instruction or other indication that following the second rule should not result in a violation of the first rule.

The object generation rules store 290 may also store the hierarchy, for example as a set of levels that each rule stored in the object generation rules store 290 may be associated with (e.g., through metadata associated with the rule as described above). In some embodiments, the object generation rules store 290 may store multiple rules in a rule package, such that the prompt configuration module 138 may access the entire rule package when requesting rules for generating an object. For example, a rule package may include a set of rules for generating an object in an object format for an ecommerce platform. Then, when the prompt configuration module 138 requests rules for generating an object for the ecommerce platform, the object generation rules store 290 may provide the rule package. In this way, a set of rules may be provided without the prompt configuration module 138 having to identify each rule, or the object generation rules store 290 having to locate each rule associated with an indication in the request from the prompt configuration module 138. Additional examples of rule packages include a rule package associated with a requesting user requesting the object to be generated, a rule package for an object format, a rule package for a machine learning model to be used (e.g., a rule package for a Llama-based LLM separate from a rule package for a GPT-4-based LLM), a rule package associated with a system in which a generated object will be stored (e.g., a rule package associated with a database configuration, a rule package associated with an ecommerce system, etc.), and the like.

Example Object Generation Machine Learning Model Routines

Figure 13:
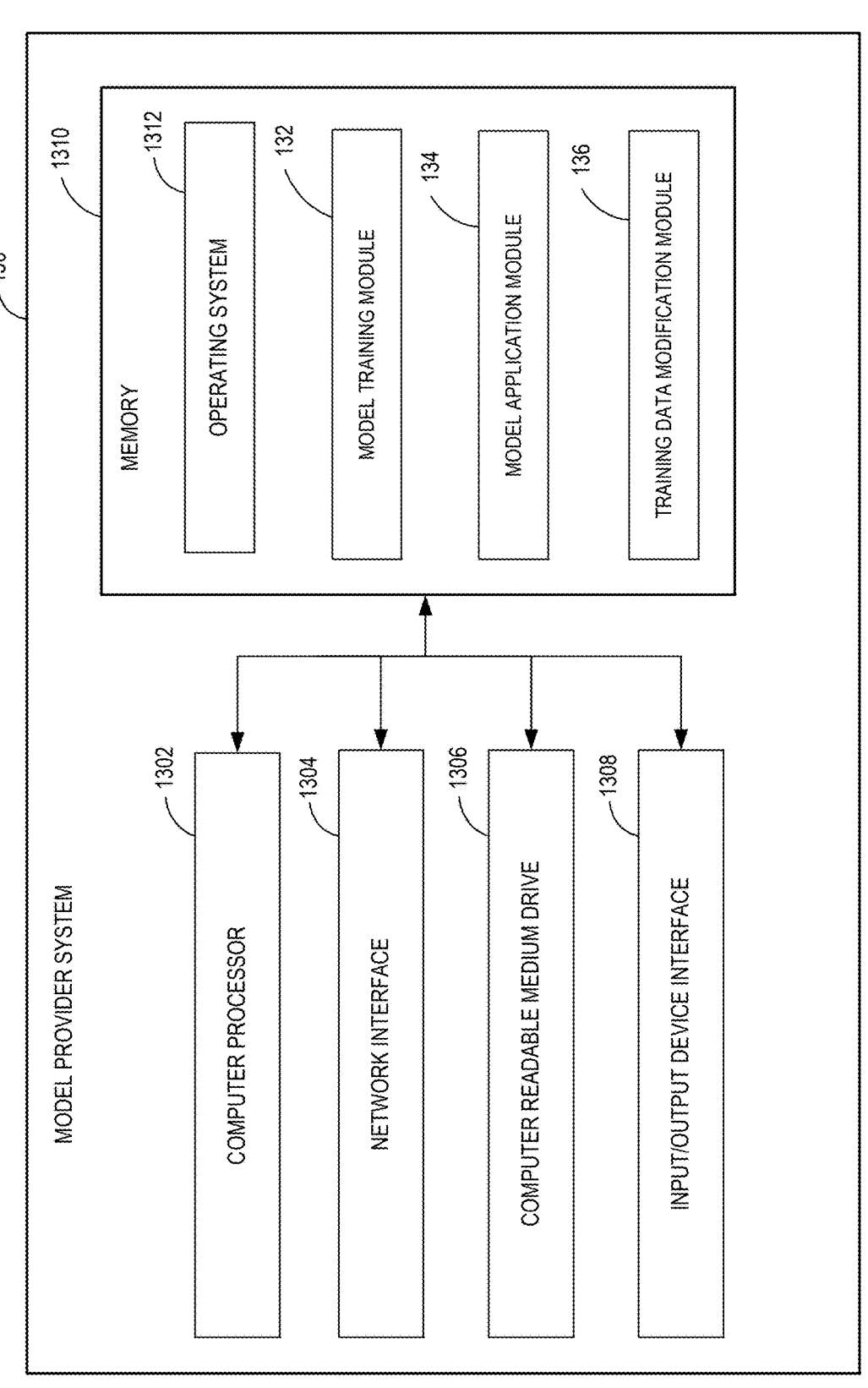
FIG. 13 is a block diagram of an illustrative computing system configured to generate or regenerate objects using a machine learning model according to some embodiments.

When a routine described herein (e.g., routine 300, 400, 500, 1500, 1550, or 1700) is initiated, a set of executable program instructions stored on one or more non-transitory computer-readable media (e.g., hard drive, flash memory, removable media, etc.) may be loaded into memory (e.g., random access memory or RAM) of a computing device, such as the memory of the model provider system 130 shown in FIG. 13, and executed by one or more processors. In some embodiments, the routine 300, 400, 500, 1500, 1550, or 1700 or portions thereof may be implemented on multiple processors, serially or in parallel.

FIG. 3 illustrates example routine 300 for training a machine learning model to generate objects according to an object format. The routine 300 begins at block 302, for example in response to a request from a requesting system 280. For example, the request may be a natural language request from a user, provided via a user interface, which indicates a machine learning model is to be trained to generate objects according to an object format. In another example, the request may be to train a machine learning model to generate objects according to a provided object format (e.g., provided as a portion of an input to the machine learning model) in a zero-shot object generation arrangement. In a further example, the request may be to train a machine learning model to identify an object format from an object input, and regenerate the object, or later-provided objects, as an improved object. It should be understood that while reference is made to training a machine learning model, the routine 300 may be used to modify a previously trained machine learning model (e.g., by re-training or fine-tuning the previously trained machine learning model) to perform object generation.

At block 304, the model provider system 130 retrieves training data to train the machine learning model from a training information system 270 (e.g., the object provider system 110 of FIG. 1). For example, the model provider system 130 may transmit a training data request (e.g., using an application programming interface) to an object provider system 110. The training data request may be based in part on the request received from the requesting system 280 to perform training of a machine learning model of the model provider system 130. For example, the request may indicate an object format for which the machine learning model is to be trained, and the model provider system 130 may then generate a training data request for objects in the indicated object format.

In some embodiments, the model provider system 130 may retrieve objects individually to be provided to the machine learning model for training. Alternatively, the model provider system 130 may retrieve a plurality of objects (e.g., a database, an ecommerce catalogue, a repository of source code, etc.) of the object format, and store the plurality of objects temporarily for use in training the machine learning model. For example, the model provider system 130 may request at least some of the records of a database having the requested object format for training the machine learning model. The model provider system 130 may then store the records for additional processing, for example to generate additional training data as described further below herein, or to provide as input directly to the machine learning model.

At block 306, the training information modification module 136 of the model provider system 130 applies targeted noising to the retrieved training data to generate modified training data. Targeted noising may include altering the retrieved training data to include errors. To perform the targeted noising of training data, the training information modification module 136 may remove, or alter, a portion of an object included in the training data. In some embodiments, during targeted noising of the training data, a plurality of portions of the object may be removed or altered. During targeted noising of the training data, the training information modification module 136 may identify a first portion of the object to modify. The training information modification module 136 may then identify a second portion of the object to modify. The training information modification module 136 may then compare the information contained in the first portion and the second portion to determine whether the first portion and the second portion relate to a same element of the object. If the first portion and the second portion relate to the same information of the object, the training information modification module 136 may then determine whether any other portion of the object relates to the same element of the object. If no other portion of the object relates to the same element, the training information modification module 136 may determine that only one portion of the object relating to the same element may be modified, so that enough information remains for the machine learning model to generate a correct output object.

For example, where the object is an ecommerce listing, the training information modification module 136 may identify the title and a structured list of attributes belonging to the ecommerce listing. The training information modification module 136 may then determine that both the title and the structured list of attributes contain information indicating a color of an item represented by the ecommerce listing. The training information modification module 136 may then analyze the remaining portions of the ecommerce listing to determine whether an additional portion of the ecommerce listing indicates the color of the item. If the training information modification module 136 determines that an additional portion (e.g., an image, user reviews, etc.) indicates the color of the item, then the training information modification module 136 may modify color information contained in both the title and the structured list of attributes and still provide enough information for the machine learning model to generate color information in the output ecommerce listing. If the training information modification module 136 determines that no additional portion of the ecommerce indicates the color of the item, the training information modification module 136 may decide not to modify at least one of the title or the structured list of attributes in a way that alters the indicated color information, such that a correct, or potentially correct, color information remains available to the machine learning model to generate an ecommerce listing from the modified ecommerce listing. In this way, ecommerce listing training data is provided to the machine learning model which differs from the retrieved training data, but continues to provide enough information for the machine learning model to learn to generate a correct ecommerce listing.

Generating modified training data through targeted noising allows for the generation of additional training data from the retrieved training data. Advantageously, where limited training data is available to be retrieved, the additional training data may allow for improved training of the machine learning mode compared to systems where modified training data is not generated. Further, the use of modified training data to train the machine learning may reduce or eliminate the need for manual labelling of training data, improving the efficiency of training the machine learning model.

In some embodiments, the retrieved training data may have previously been generated through targeted noising, a sufficient amount of training data may have been retrieved such that targeted noising is not necessary to generate additional training data, or targeted noising of the training data may be otherwise determined to be undesirable or unnecessary, and block 306 may be omitted.

At block 308, the training information modification module 136 may apply further randomization to the modified training data. For example, if objects of the modified training data contain an element having an order (e.g., a structured list of attributes, a title, a natural language description, etc.) the training information modification module 136 may randomize, or otherwise alter, the order of the information in the element. Advantageously, applying further randomization to the training information, and using such training information to train a machine learning model, may improve the ability of the trained machine learning model to generate structured objects from unstructured, or differently structured input information. In some embodiments, further randomization may not be desirable, or useful, such as where the training data retrieved at block 304 had been previously generated through randomization of existing objects, or where a determination is made that the amount of retrieved training data is sufficient for training the model, and the routine 300 may omit block 308.

At block 310, the model training module 132 of the model provider system 130 provides the modified training data as input to a machine learning model to be trained. Providing the training data as input to the machine learning model may cause the machine learning model to generate an output, which may be stored by the model provider system 130.

At block 312, the model training module 132 compares the output of the machine learning model to the original training data. The result of the comparison may be a measure of the accuracy of the machine learning model in regenerating the original object from the training data, before the object was modified as part of the modified training data.

At block 314, the model training module 132 modifies the machine learning model based on the result of the comparison at block 312. In some embodiments, the machine learning model may be untrained, and the result of the model training module 132 modifying the machine learning model is a trained machine learning model. In alternative embodiments, the machine learning model may have previously been trained, for example as a large language model trained on a large corpus of text. The previous training may be related to the purpose for which the machine learning model is being modified herein (e.g., object generation). Alternatively, the previous training may be unrelated to the purpose for which the machine learning model is being modified herein. Modifying the machine learning model may include, for example, adjusting one or more weights connecting nodes of a neural network, modifying an encoder used to represent input data in an embedding space, or any other modification of a machine learning model known to be used during a machine learning model training process. Further, after modifying the machine learning model, a validation step may occur in order to determine whether additional training of the machine learning model is required. For example, one or more validation objects may be provided as input to the machine learning model and compared to an expected output (e.g., a ground truth dataset), and a threshold accuracy, or other target value, may be used to determine whether the machine learning model training is complete. When additional training of the machine learning model is required, at least one of the previously described blocks of the routine 300 may be repeated. Such repeated blocks may be repeated serially, or in parallel, for at least a portion of the retrieved training data.

At block 316, the model provider system 130 stores the trained machine learning model for later use. For example, the model provider system 130 may store the machine learning model in a model store 140. When storing the trained machine learning model, the model provider system 130 may include metadata associated with the trained machine learning model. For example, the metadata may indicate a type of training performed on the trained machine learning model, a training information system 270 or object store 115 from which training data was obtained to train the machine learning model, an object format for which the machine learning model is trained to generate objects, and the like. When the model provider system 130 has stored the machine learning model, the routine 300 moves to block 318 and ends.

Figure 4:
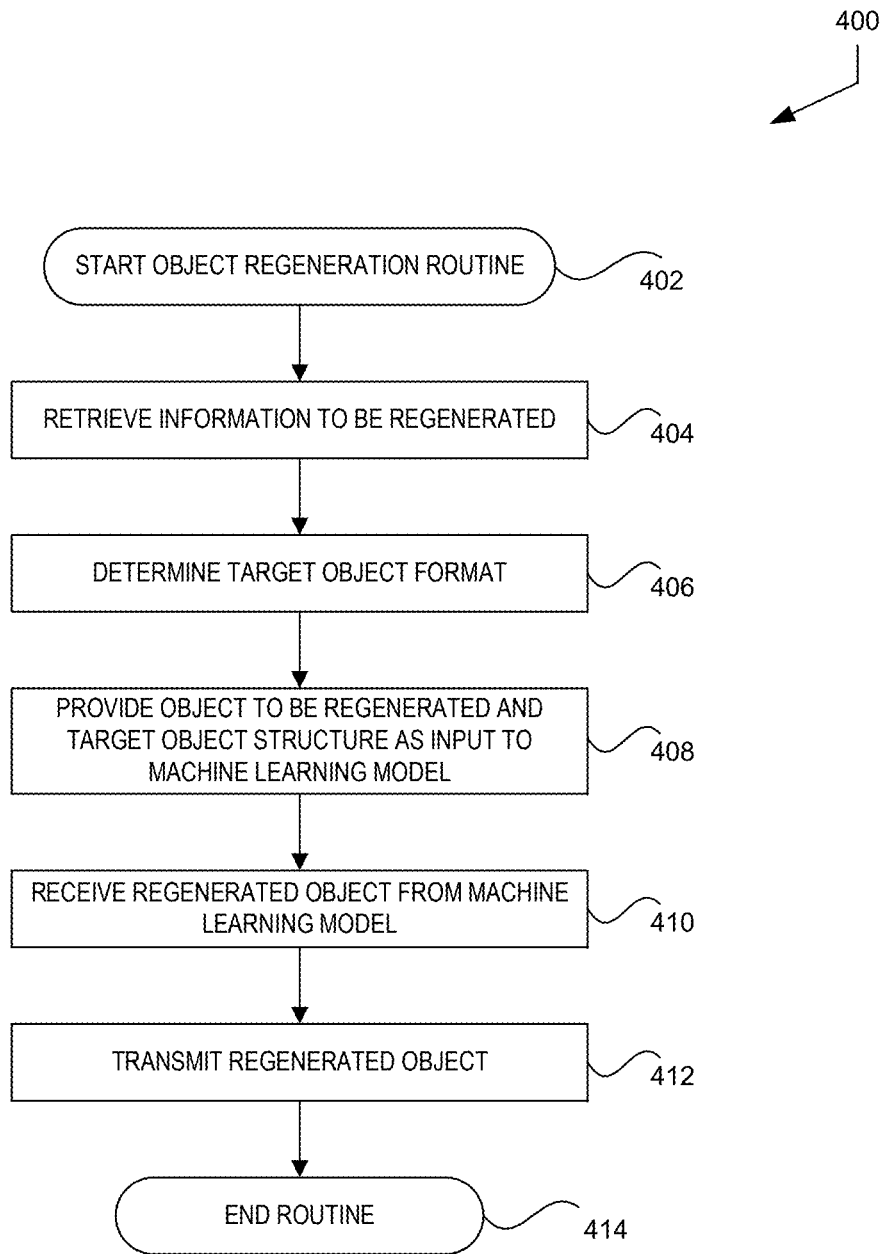
FIG. 4 is a flow diagram of an illustrative routine for regenerating an existing object using a machine learning model to create an improved object according to some embodiments.

FIG. 4 illustrates example routine 400 for regenerating an existing object according to an object format using a machine learning model. The routine 400 begins at block 402, for example in response to the model provider system 130 receiving a request to regenerate an object, from a requesting system 280. The request may be a natural language request from a user associated with the requesting system 280. Alternatively, the request may be an automatically generated request, generated by the requesting system 280 in response to determining that the object to be regenerated should be regenerated. For example, the requesting system 280 may determine that an object in an object store 115 is likely to be incomplete, likely to be incorrect, generated at a time before a current object format was used for objects stored in the object store 115, or for any other reason it may be useful to regenerate an object. The request received by the model provider system 130 may include an indication of an object provider system 110, or the object store 115, from which the object to be regenerated can be retrieved. In some embodiments, the request may indicate a plurality of objects to be regenerated, and the routine 400 may regenerate at least one of the indicated plurality of objects. Alternatively, the request may indicate a range of values associated with at least one object of an object store 115 for the model provider system 130 to retrieve. For example, the request may indicate that all objects last modified prior to a specific date should be retrieved for regeneration. In another example, where the objects to be regenerated are ecommerce listings, the request may indicate that all objects associated with an item type (e.g., men's clothing, hats, televisions, books, etc.) are to be regenerated.

At block 404, the model provider system 130 retrieves the information to be regenerated into an object from an object store 115, information provider system 260, or content seed system 120. For example, the model provider system 130 may send a retrieval request to a content seed system 120 to retrieve the information to be regenerated into an object from a content seed store 125. The information retrieved for object regeneration may be unstructured information (e.g., text information, multimodal information, etc.), or may be structured information (e.g., a previously generated object). The retrieval request may be based, at least in part, on the request received from the requesting system 280. In some embodiments, the model provider system 130 may determine the correct object provider system 110 or object store 115 to which the retrieval request should be sent. For example, where the request received from the requesting system 280 was a natural language request indicating the name of a database from which objects are to be regenerated, the model provider system 130 may identify an object provider system 110 associated with the database and transmit the retrieval request to the identified object provider system 110. In additional embodiments, the model provider system 130 may retrieve the object to be regenerated from a content seed store 125 by transmitting the retrieval request to a content seed system 120.

At block 406, the model provider system 130 determines the object format into which the object to be regenerated will be regenerated. The target object format may be indicated by the request received from the requesting system 280. Alternatively, the target object format may be known for the object store 115 from which the object to be regenerated was retrieved (e.g., the object format may be stored in a listing of object formats associated with object stores accessible to the model provider system 130). In another alternative, the object to be regenerated may be retrieved from a content seed system 120, and the model provider system 130 may retrieve an example object in the target object format from an object store 115 where the regenerated object will be stored. In embodiments where the machine learning model is configured for an object format, this determination may not be needed, and the routine 400 may move to block 408.

At block 408, the model provider system 130 provides the object to be regenerated and the target object format as input to a machine learning model 135 operating in the model application module 134, for example as part of a prompt to the machine learning model 135 to regenerate the object. The target object format may be provided as an outline, or schema, describing the target object format. Alternatively, the target object format may be provided using an example object which is already structured according to the target object format. In some embodiments, the object to be regenerated may be missing information useful to complete the object according to the target object format. Such information may be provided to the model application module 134 by the model provider system 130, for example as part of a prompt to the machine learning model to regenerate the object. Alternatively, the machine learning model may have been trained on a large corpus of information and may infer a correct value for the missing information based on latent knowledge learned from the large corpus of information on which the machine learning model was trained. Where there is missing information, an indication of the missing information may be included in the prompt to regenerate the object provided to the machine learning model, or the machine learning model may be relied on to determine the information is missing from the object to be regenerated.

At block 410, the model application module 134 provides the regenerated object to the model provider system 130. The regenerated object may have been generated by the model application module 134 using the machine learning model 135. The machine learning model 135 may generate the regenerated object in response to the input provided by the model provider system 130 at block 408. The regenerated object generated by the machine learning model 135 is an internally consistent object generated in a single pass of the machine learning model 135.

At block 412, the model provider system 130 transmits or stores the regenerated object. For example, the model provider system 130 may transmit the regenerated object to the requesting system 280. Alternatively, the model provider system 130 may transmit the regenerated object to an object provider system 110 for storage in an object store 115. The object store 115 where the regenerated object is transmitted may be the same object store 115 from which the object to be regenerated was retrieved, or may be a different object store 115. For example, the object to be regenerated may have been retrieved from an object store 115 belonging to a first ecommerce provider, and the regenerated object may be transmitted to an object store 115 belonging to a second ecommerce provider storing objects according to the object format into which the regenerated object was regenerated. When the model provider system 130 has transmitted the regenerated object, at least a portion of the routine 400 may repeat in order to regenerate additional retrieved objects (e.g., a set of records currently stored in a database). Portions of the routine 400 may be performed serially or in parallel during the regeneration of multiple objects. In some embodiments, the model provider system 130 may store a plurality of regenerated objects to be transmitted as a group. When the model provider system 130 has transmitted the regenerated object, or objects, and there are no further objects to regenerate, the routine 400 moves to block 414 and ends.

Figure 5:
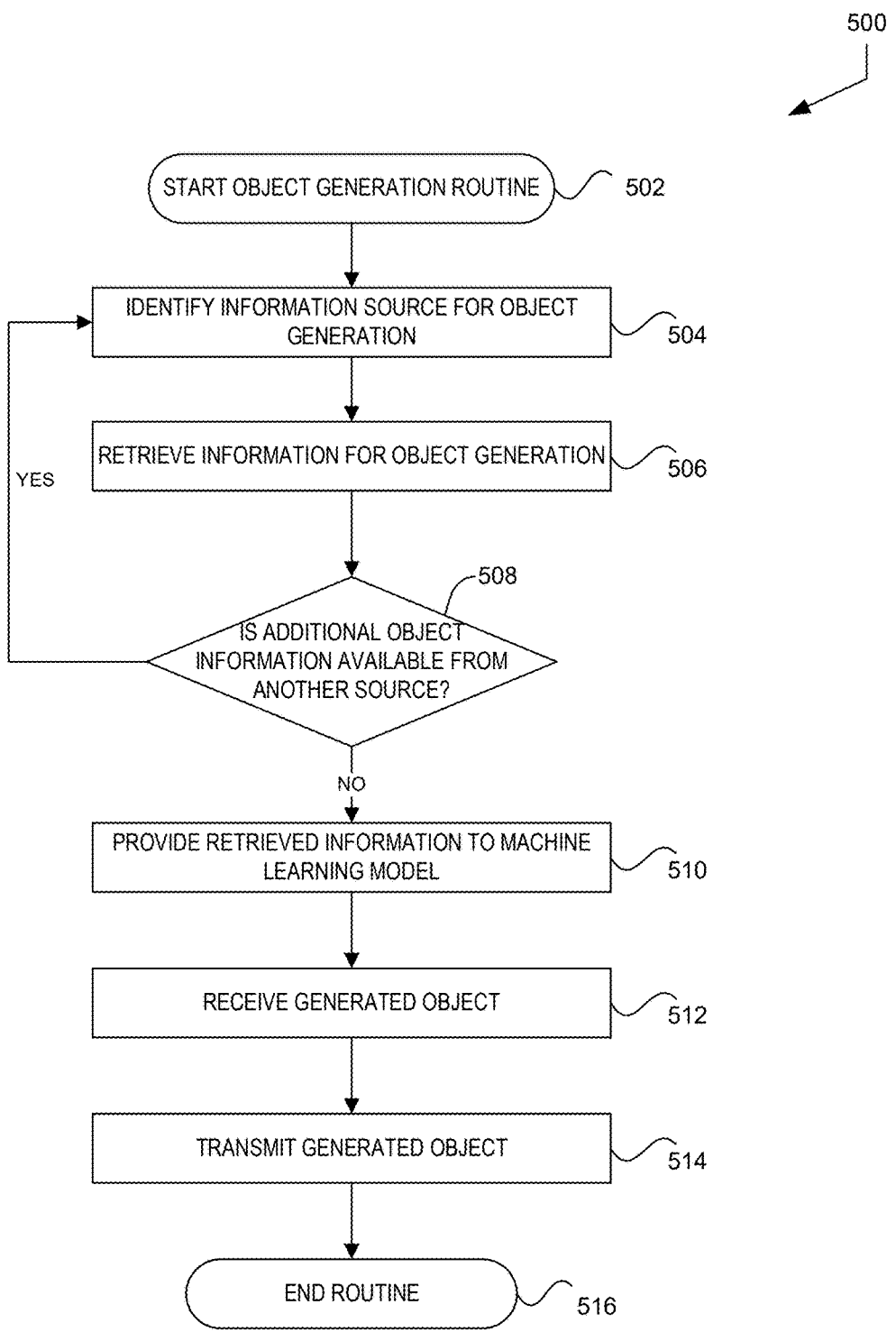
FIG. 5 is a flow diagram of an illustrative routine for generating an object using a machine learning model according to some embodiments.

FIG. 5 illustrates example routine 500 for generating an object in an object format using a machine learning model. The routine 500 begins at block 502, for example in response to the model provider system 130 receiving a request from a requesting system 280 to generate an object in an object format. The request may be a natural language request received from a user associated with the requesting system 280. For example, the request may be received from a seller using an ecommerce platform, and the request may be to generate an ecommerce listing for an item. In another example, the request may be received from a database administrator, and the request may be to convert an object from a first database schema to a second database schema. In some embodiments, the request may indicate a target object format according to which the object is to be generated. Alternatively, the model provider system 130 may determine the object format from information provided in the request, for example a target object provider system 110 to which the generated object is requested to be transmitted.

At block 504, the model provider system 130 identifies an information source for information used to generate the requested object. In some embodiments, the information source may be a content seed system 120 or an object provider system 110. The model provider system 130 may identify the information source based on the request, or the request may explicitly identify the information source to be used to generate the object.

At block 506, the model provider system 130 retrieves information to be used for object generation from the identified information source. The retrieved information may be, for example, an existing object in a same or a different object format, unorganized text information associated with the object to be generated, an image, a sound, a video, or any other source from which information may be identified or generated to generate the requested object.

At decision block 508, the model provider system 130 determines whether another information source may have information useful for generating the requested object. For example, where the requested object is an ecommerce listing for a first ecommerce provider, a first information source identified in the request may be a content seed store 125. The model provider system 130 may then determine that a second information source for the object to be generated may be an alternative ecommerce provider, for example by performing a search for related information using a machine learning model. The routine 500 may then return to block 504, and the model provider system 130 may identify the alternative ecommerce provider as an information source for object generation. In another example, the requested object may be a database record, and the initial information source identified may be a first object store 115 having a different database schema than a target object store 115 indicated in the request. The model provider system 130 may then determine that additional information useful for generating the requested object exists in the target object store 115, and return to block 504 to retrieve information from the object store 115 useful for generating the requested object. When the model provider system 130 determines that there is no additional object information available from another source, or that a sufficient amount of information to generate the requested object has been retrieved, the routine 500 moves to block 510. Additionally, it should be understood that as an alternative to repeating block 504 and block 506 for each information source, the model provider system 130 may comprise a plurality of information retrievers which retrieve some or all of the information used to generate the requested object from different data sources in parallel.

At block 510, the model provider system 130 provides the retrieved information useful for generating the requested object to the model application module 134. The model application module 134 may then provide the information to one or more machine learning models, for example a machine learning model obtained from the model store 140. The information may be provided to the machine learning model as part of a prompt. The prompt may be written in natural language. The prompt may include at least a portion of the request, for example if the request includes a target object format the prompt may include the target object format. Additionally, the prompt may include an exemplary object from which the machine learning model can determine the target object format. Further, the prompt may include additional information, for example a type of the target object store 115 at which the generated object will be stored, an object definition (e.g., a schema for a database object, a software object definition, etc.), or a requirement of the generated object (e.g., a maximum size of a portion of the generated object, a maximum size of the generated object, a minimum number of attributes for the generated object, etc.). Further, the prompt may indicate to the machine learning model that where a portion of the generated object cannot be generated based on the provided information, the machine learning model is to infer a likely value based on existing knowledge of the machine learning model (e.g., latent knowledge of a large language model stored by the large language model during training).

At block 512, the model application module 134 transmits the generated object to the model provider system 130. The machine learning model 135 of the model application module 134 may generate the generated object based on the retrieved information provided to the model application module 134 at block 510. The machine learning model 135 may then generate the generated object in a single pass, where the generated object is an internally consistent object. Additionally, the machine learning model 135 may provide additional information, such as a source of the information used to generate a portion of the generated object, an indication that a portion of the generated object was inferred from latent knowledge of the machine learning model, a confidence score indicating a confidence of the machine learning model that the generated object was correctly generated, an indication of an attribute in which the generated object that the machine learning model has a low confidence, and the like. The model application module 134 may then provide such additional information to the model provider system 130. Further, the machine learning model of the model application module 134 may receive retrieved information from a plurality of information sources, which may store information in different formats. The retrieved information may also include conflicting information from different information sources (e.g., a first information source may provide a first value for the size of a shirt, and the second information source may provide a second value for the size of the shirt). The machine learning model may then reconcile the conflicting information as part of generating the requested object.

At block 514, the model provider system 130 transmits or stores the generated object. For example, the model provider system 130 may transmit the generated object to the requesting system 280. Alternatively, the request may indicate a target object provider system 110 or object store 115 to which the generated object is to be transmitted. When the model provider system 130 has transmitted the object, the routine 500 moves to block 516 and ends.

Example Ecommerce Object Generation

Figure 6:
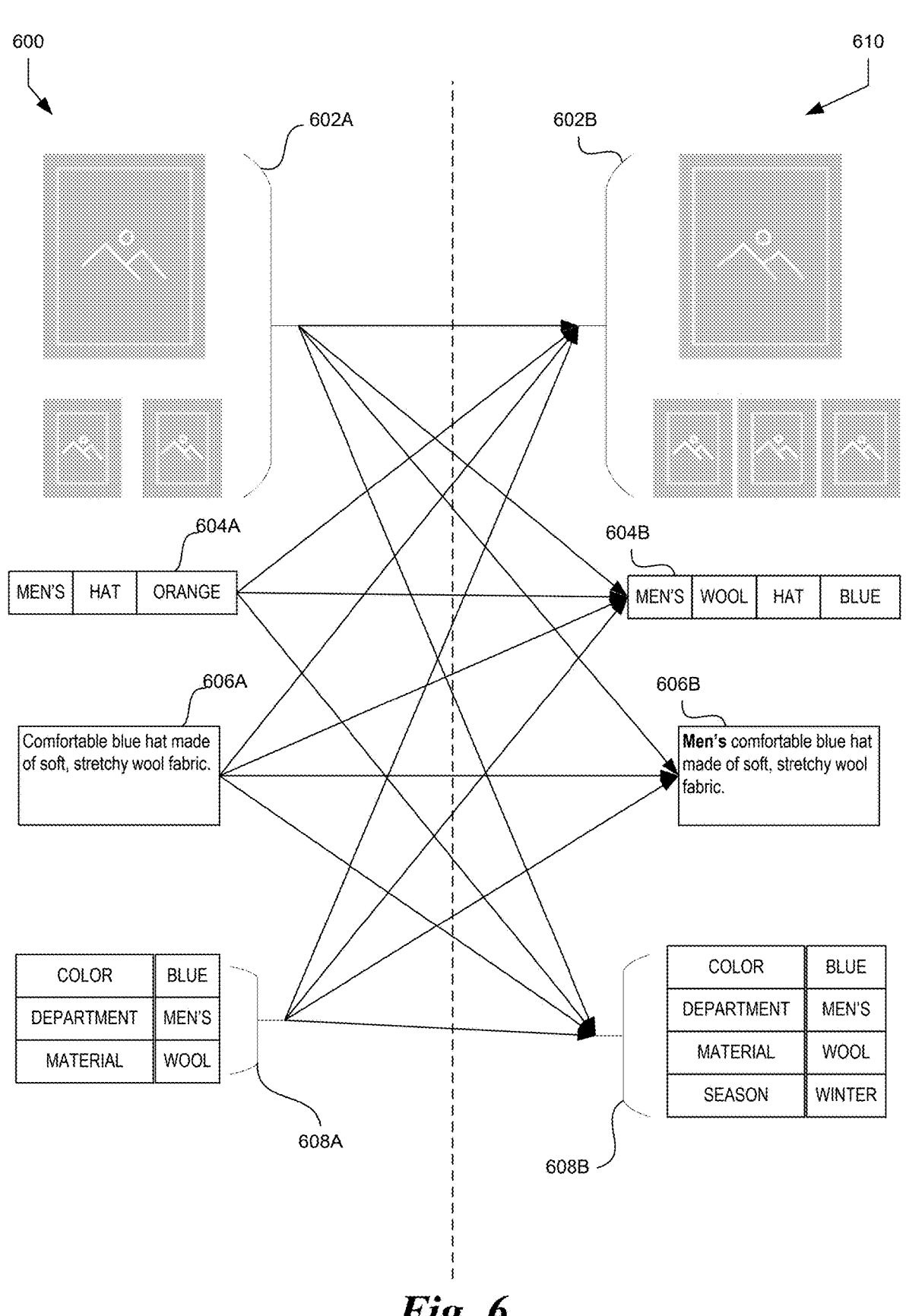
FIG. 6 is a block diagram of an illustrative example object regeneration in an ecommerce environment according to some embodiments.

FIG. 6 illustrates a graphical representation of object regeneration for a listing on an ecommerce platform using the system described previously herein. While the present example relates to a listing on an ecommerce platform, it should be understood that the description herein may be applied to objects or listings for alternative platforms, for example review platforms, content provider platforms (e.g., video content providers, image providers, etc.), and the like. Additionally, while in the present example objects are generally described as listings for an ecommerce platform having defined formats, it should be understood that the description herein may be applied to an object having any format, including multimodal objects.

An initial listing 600 includes an initial image set 602A, an initial title 604A, an initial description 606A, and an initial structured attribute set 608A.

The initial image set 602A is a set of one or more images representative of an item associated with the listing. For example, the image set may include images of different viewpoints of the item (e.g., a cross-sectional view, frontal view, interior view, etc.), or different uses of the item (e.g., a clothing item being worn, a utility item in use, etc.). Such images may be in color, black and white, and/or grayscale. Further, the images may be useful for the determination of item information for the item. For example, the images may be used by a machine learning model to identify a brand, a size, a style, a use, a physical attribute, and the like, for the item.

The initial title 604A is a textual representation of a summary of item information. The initial title 604A may be manually generated, for example by the seller, or automatically generated. The initial title 604A may be a summary of details of the item, and may be intended to provide sufficient information to a potential buyer to generate interest in the item.

The initial description 606A is a detailed description of the item, and may include text, images, video, audio, and multimedia information. In the example described herein related to FIG. 6, the initial description 606A is a textual detailed description of the item. The initial description 606A may have been manually generated, or automatically generated. The initial description 606A may include item details for the item associated with the initial listing 600. The initial description 606A may further include marketing copy, such as descriptions of how the use of the item may improve a potential customer's life, or otherwise positively affect the potential customer. Therefore, a machine learning model of the model provider system 130 may, when regenerating the listing to generate the regenerated listing 610, parse the initial description 606A to identify useful item information and separate such useful item information from the marketing copy.

The initial structured attribute set 608A is a structured listing (e.g., a table) of attributes associated with the item. The initial structured attribute set 608A may include attribute information formatted according to a defined structure. The defined structure may be common to a set of items (e.g., a set of attributes common to all hats, all clothing, etc.).

The regenerated listing 610 is an item listing generated by the model provider system 130 using at least part of the initial listing 600 as input. The regenerated listing 610 includes a regenerated set of images 602B, a regenerated title 604B, a regenerated description 606B, and a regenerated structured attribute set 608B. The regenerated listing 610 may be generated for the same ecommerce platform, or for a different ecommerce platform having a different item listing schema. As indicated by the arrows between the elements of the initial listing 600 and the elements of the regenerated listing 610, a plurality of elements of the initial listing 600 may be used by the model provider system 130 to generate the regenerated listing 610. It should be understood that the many arrows shown in the figure are illustrative of possible combinations of information from the initial listing 600 which may be used to generate portions of the regenerated listing 610. Alternative implementations may use more, fewer, or alternative combinations of portions of the initial listing 600 to generate portions of the regenerated listing 610. Further, the arrows shown here do not represent individual executions of a machine learning model. Instead, all portions of the regenerated listing 610 are generated as part of a single pass of the machine learning model, based on receiving the initial listing 600 as input to the single pass, ensuring that the regenerated listing 610 comprises internally consistent information between portions of the regenerated listing 610.

Advantageously, the machine learning model of the model provider system 130 used to regenerate the initial listing 600 may regenerate each element of the initial listing 600 during a single pass. Regenerating the initial listing 600 in a single pass may allow the model provider system 130 to ensure that each element of the regenerated listing 610 is internally consistent. That is, the model provider system 130 may ensure that a first element of the regenerated listing 610 does not provide information which conflicts with a second element of the regenerated listing 610. For example, as shown here, the initial listing 600 includes the initial title 604A which indicates the men's hat is orange. However, this conflicts with the indication in the initial description 606A and the initial structured attribute set 608A that the hat is blue. When regenerating the initial listing 600 to generate regenerated listing 610, but using information from multiple elements of the initial listing 600 and generating the regenerated listing 610 in a single pass, the model provider system 130 ensures that the regenerated title 604B, regenerated description 606B, and regenerated structured attribute set 608B are consistent in their description of the hat as being blue.

During generation of the regenerated listing 610, the model provider system 130 may use information from any number of elements of the initial listing 600. Additionally, the machine learning model used by the model provider system 130 may infer, based on the training of the machine learning model, that one or more elements are more likely to indicate a correct value for an item attribute, for example based on the portion of the object where the element and associated value are identified. Therefore, while in the present example two elements of the initial listing 600 indicate the hat is blue, and this is taken as correct in the regenerated listing 610, it should be understood that such a determination of the correct attribute value may not be based on the number of elements agreeing on the attribute value. For example, the machine learning model may infer, based on its training, that an image is the most likely to indicate a correct attribute value for color. The machine learning model of the model provider system 130 may then generate a regenerated title 604B, regenerated description 606B, and regenerated structured attribute set 608B which indicate a different color (e.g., green) based on the initial image set 602A, even though the initial description 606A and initial structured attribute set 608A agree on the color blue.

Further, when generating the regenerated listing 610, the model provider system 130 may include additional information in one or more of the portions of the regenerated listing 610. For example, as shown here, the regenerated title 604B includes the word "wool" indicating the material of the hat, and the regenerated structured attribute set 608B includes an additional element of "season" with the value "winter". This additional information may be included based on the schema for the ecommerce platform indicating a material type is to be included in an item title for clothing. Alternatively, the additional information may be included based on training of the machine learning model of the model provider system 130 indicating that a material should be included in the title for this item.

Figure 7:
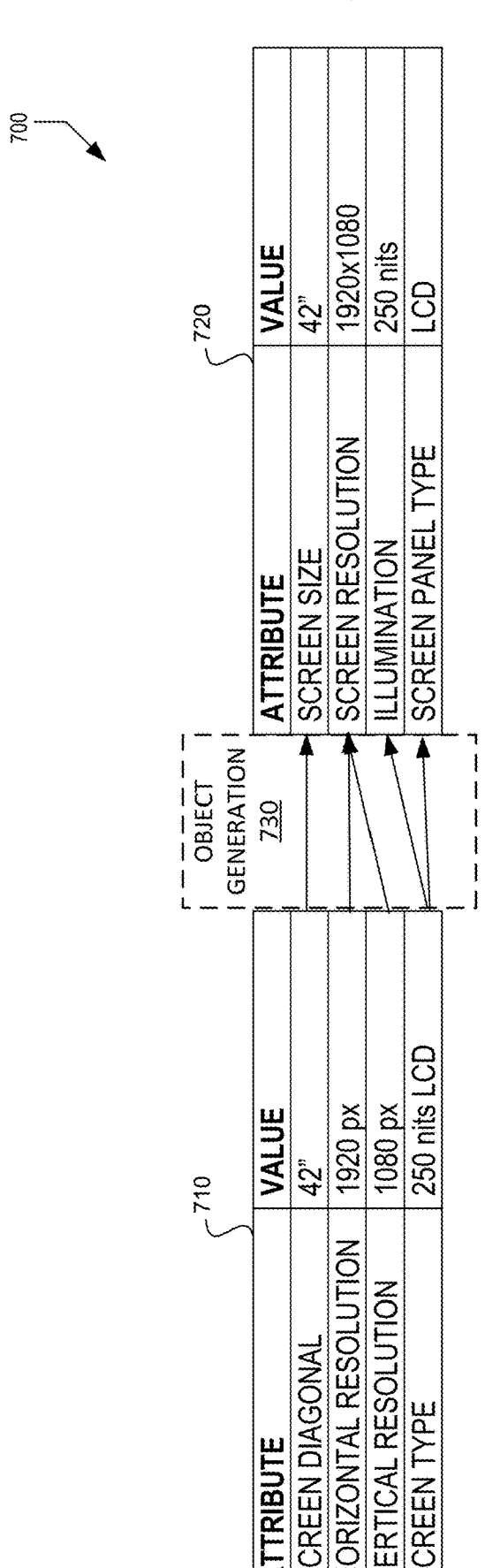
FIG. 7 is an illustrative example of generating an object according to a target schema from organized retail information using a machine learning model according to some embodiments.

FIG. 7 illustrates an example generation of a generated structured set of item attributes 720 for a target ecommerce platform from an existing structured set of item attributes 710 from a source ecommerce platform having a different schema for organizing item information. While the existing structured set of item attributes 710 and generated structured set of item attributes 720 of this example are displayed in tabular form, it should be understood that the tabular format is used herein for ease of description only and other data formats (e.g., JSON objects, list data objects, etc.) capable of storing item information may be used. Further, while the present example relates to item listings for ecommerce platforms, the description herein may be applied to any structured object.

The existing structured set of item attributes 710 include a plurality of attributes associated with an item. Each attribute of this example has a unique identifier indicating the attribute type (e.g., Screen Diagonal, Screen Type, etc.) and an associated value. Further, the generated structured set of item attributes 720 includes a set of attributes used by a target ecommerce platform for which the generated structured set of item attributes 720 was generated. The model provider system 130 may be provided with the existing structured set of item attributes 710 and a request to generate the generated structured set of item attributes 720 using the routine 400 or routine 500 described previously herein in relation to FIGS. 4 and 5. When performing object generation 730, the machine learning model of the model provider system 130 may determine attribute types of the target ecommerce platform corresponding to attribute types of the source ecommerce platform. Further, the model provider system 130 may determine that a unit of measurement for an attribute of the existing structured set of item attributes 710 is different from a unit of measurement for an attribute of the generated structured set of item attributes 720. The model provider system 130 may then normalize the values of the existing structured set of item attributes 710 for the generated structured set of item attributes 720 by converting between the unit of measurement of the source ecommerce platform and the target ecommerce platform. Normalization may also include, for example, normalizing an element type, normalizing a value of an element, or normalizing a length of a value.

As shown in this example, some attributes may have an attribute type and associated value in the existing set of item attributes which corresponds to two or more attributes in item listings of the target ecommerce platform. Therefore, when performing object generation 730, the model provider system 130 may determine an attribute type of the target ecommerce platform corresponds to a plurality of attribute types of the source ecommerce platform. The model provider system 130 may then assign attribute values from each of the plurality of attribute types of the source ecommerce platform to the associated attribute type of the target ecommerce platform. Relatedly, the model provider system 130 may determine a plurality of attribute types of the target ecommerce platform correspond to a single attribute of the source ecommerce platform. The model provider system 130 may then assign the value from the single attribute type of the source ecommerce platform to the plurality of attribute types of the target ecommerce platform. While a one to many, and many to one, relationship have been described herein, it should be understood that the same description applies to many attribute relationships as well.

Figure 8:
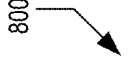
FIG. 8 is an illustrative example of generating an object from unordered information according to a target schema using a machine learning model according to some embodiments.

FIG. 8 illustrates an example generation of a set of item attributes 820 from a source image 810 using object generation 830. While the present example relates to generating item attributes for an item listing for ecommerce platforms, the description herein may be applied to generating any structured object.

The source image 810 of this example is a backpack, and includes a caption indicating the backpack is designed for girls. While the source image 810 has a caption in the present example, it should be understood that no caption is required for the generation of the set of item attributes 820 by the model provider system 130 during object generation 830.

To generate the set of item attributes 820, the model provider system 130 receives the source image 810 as input. The source image 810 is then applied as input to a machine learning model using the model application module 134 to generate the set of item attributes 820. The structure of the set of item attributes 820 may be provided as input to the machine learning model, or the structure of the set of item attributes 820 may be understood by the machine learning model based on its training (e.g., as described above in relation to FIGS. 4 and 5). The machine learning model of the model provider system 130 generates the entirety of the set of item attributes 820 in a single pass, meaning that the entire set of item attributes 820 is generated without the need to use the model application module 134 for each attribute of the set of item attributes 820 individually. Generating the set of item attributes 820 in a single pass ensures that the attributes generated during object generation 830 are internally consistent with each other, without the need for additional computing resources to verify such consistency. Advantageously, ensuring internal consistency both improves the speed of the object generation 830 and use of the set of item attributes 820, while improving the overall quality of the set of item attributes 820 generated by the model provider system 130.

Where attribute information of the set of item attributes 820 is not explicitly indicated by the source image 810, the machine learning model of the model provider system 130 may infer such values based on many factors, including generated attribute values based on the source image 810, and contextual information available to the machine learning model based on the training of the machine learning model. For example, no element of the source image 810 indicates the "Department" attribute value for the set of item attributes 820. During object generation 830, the machine learning model may determine the value of the "Department" attribute has a value of "Children-Girls" based on the caption, the image, other attributes of the set of item attributes 820, and/or the latent knowledge of the machine learning model.

Example Training Data Generation

Figure 9:
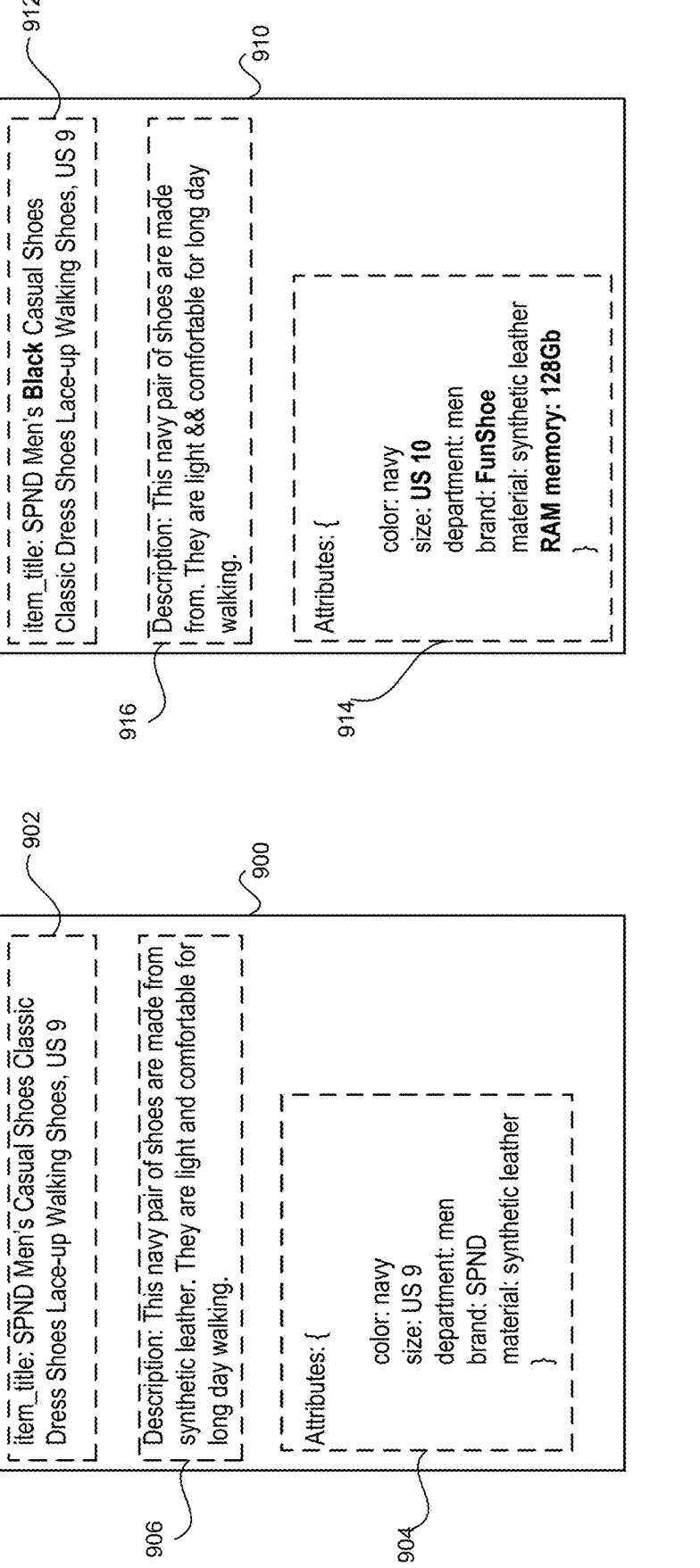
FIG. 9 is an illustrative example of generating noisy training data for use in training an object generation machine learning model according to some embodiments.

FIG. 9 illustrates an example generation of noisy object information 910 from initial object information 900 by the training information modification module 136 of the model provider system 130. The initial object information 900 includes an initial title 902, an initial description 906, and an initial set of attributes 904. The noisy object information 910 includes a noisy title 912, a noisy description 916, and a noisy set of attributes 914.

The initial object information 900 may be provided as input to the training information modification module 136. The training information modification module 136 may then, as shown in this example, determine portions of the initial object information 900 which may be altered with noise information to generate additional training data as described previously herein. The training information modification module 136 in this example adds a color value to the noisy title 912 of the noisy object information 910, where the added color value of the noisy title 912 conflicts with the color value of the initial set of attributes 904 and noisy set of attributes 914, and where there was no color value present in the initial title 902. Further, the training information modification module 136 in this example alters the "Size" attribute of the noisy set of attributes 914 and the "Brand" value of the noisy set of attributes 914 to a value that is inconsistent with the initial title 902 and the noisy title 912. Additionally, the training information modification module 136 may add elements unrelated to, or otherwise not included in an object format of, an initial object from which a noisy object is being generated. In the present example, the training information modification module 136 adds the "RAM memory" attribute to the noisy set of attributes 914. Notably, the "RAM memory" attribute does not exist in the initial set of attributes 904, and would not normally be associated with shoes. The training information modification module 136 further applies noise to the initial description 906 to generate the noisy description 916. In this example, the training information modification module 136 removes information in the initial description 906 indicating the material associated with the shoes, and changes the word "and" in the initial description 906 to a symbolic representation of "&&" in the noisy description 916. This noisy set of attributes 914 may then be used as one portion of the training data provided to the machine learning model during training by the training information modification module 136.

Example Object Generation User Interfaces

Figure 10:
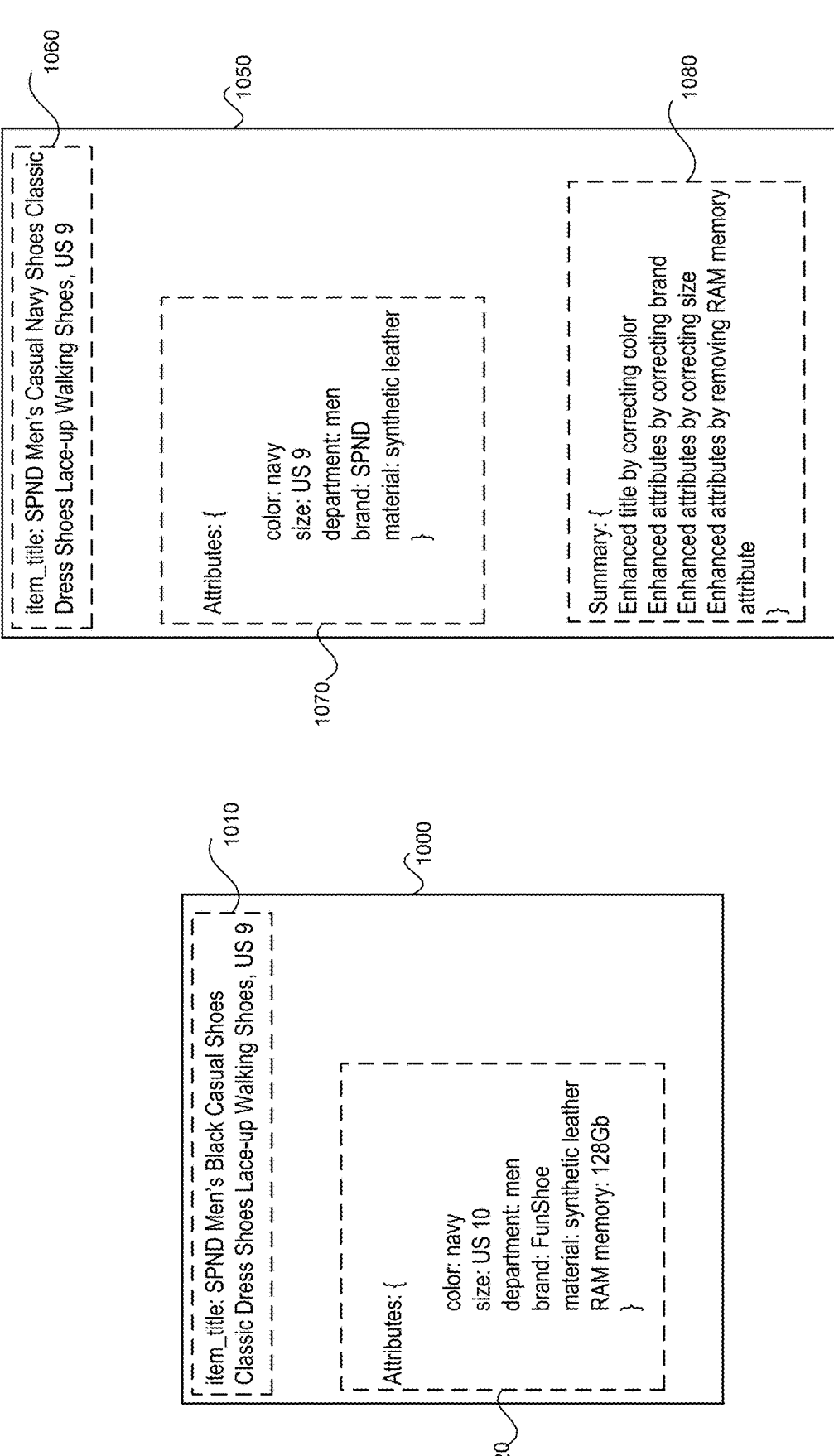
FIG. 10 is an illustrative example of a user interface for assessing the generation of an object using an object generation machine learning model according to some embodiments.

FIG. 10 illustrates an example user interface 1050 providing a verbose output 1080 explaining changes made when regenerating the listing title 1060 and listing attributes 1070 from the initial listing 1000 using a machine learning model of the model provider system 130.

The initial listing 1000 may be a previously stored item listing of an ecommerce platform. Alternatively, the initial listing 1000 may be a listing for an item on a second ecommerce platform. While listings on ecommerce platforms are described in relation to this figure, it should be understood that the model provider system 130 may provide a verbose output describing changes made to any object regenerated by the model provider system 130. It should be noted that the model provider system 130 may have generated the listing title 1060 and the listing attributes 1070 in a single pass, using the initial listing 1000 as input. Generating the listing title 1060 and the listing attributes 1070 in a single pass allows for efficiently ensuring internal consistency between the listing title 1060 and the listing attributes 1070.

The verbose output 1080 indicates to a user of the model provider system 130 what changes were made when regenerating the initial title 1010 and the initial listing attributes 1020 to generate the listing attributes 1070 and listing title 1060. The verbose output 1080 may be provided to a user via a graphical user interface presented by, for example, a display of the requesting system 280. In some embodiments, the user may then provide feedback, such as by editing the listing title 1060 and/or the listing attributes 1070. Providing the verbose output 1080 to the user may allow the user to more efficiently determine whether any such manual adjustments are desirable. While only text is shown in the user interface 1050 of this example, images, video, audio, and/or multimedia may be included in the user interface 1050.

Figures 11A, 11B, 11C:
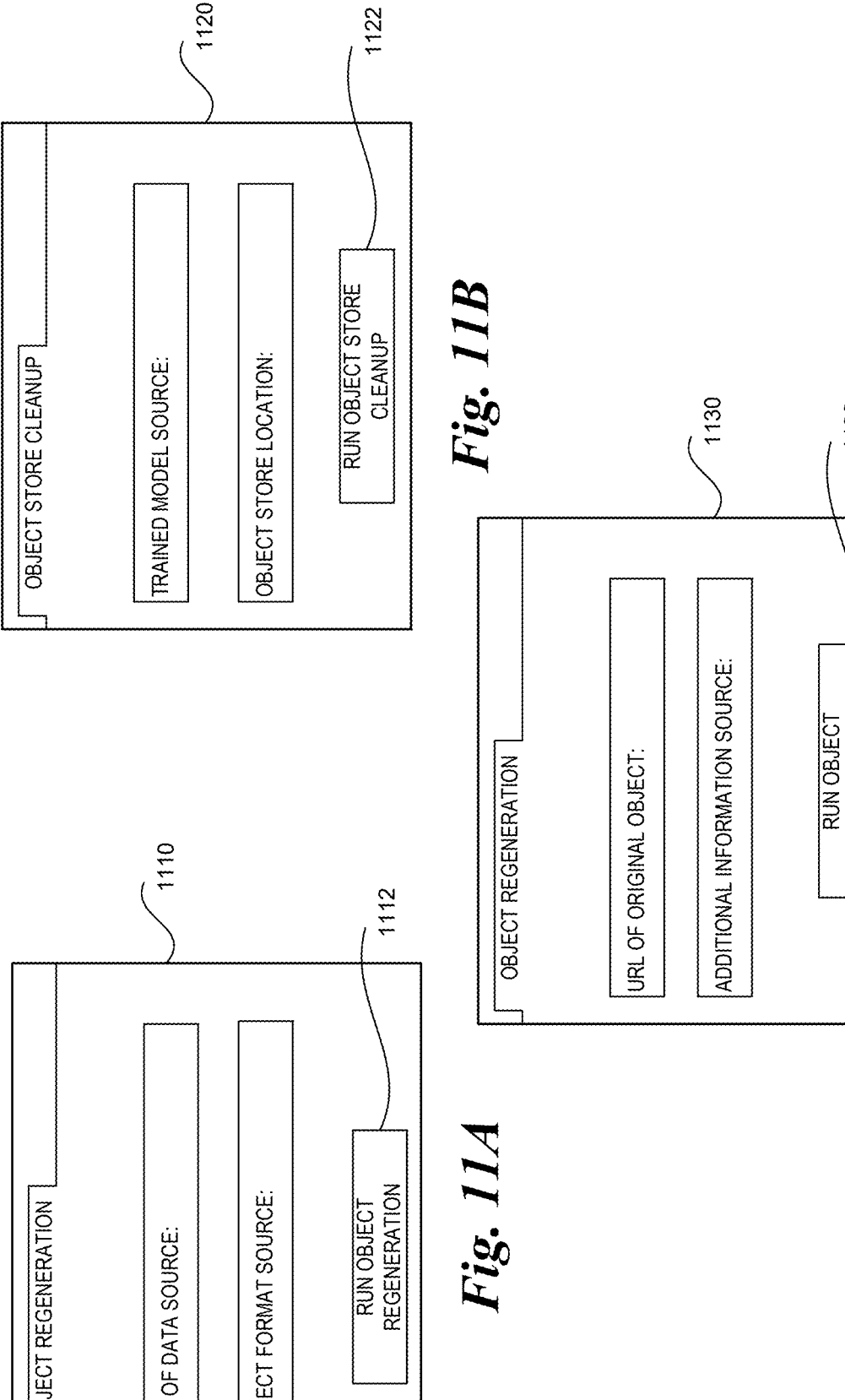
FIG. 11A is an illustrative example of a user interface for providing regeneration of an object from a source provided by a user according to some embodiments.
FIG. 11B is an illustrative example of a user interface for providing object cleanup of a data store provided by a user according to some embodiments.
FIG. 11C is an illustrative example of a user interface for providing regeneration of an object from a source based on a content seed provide by a user according to some embodiments.

FIG. 11A illustrates an example user interface 1110 for allowing a user to regenerate objects from a data source provided by the user (e.g., a first object store 115) using an object format provided by the user. In this example, the machine learning model of the model provider system 130 is assumed to be trained to perform zero-shot object regeneration using an object and an object format as input. When the user presses the button 1112, the model provider system 130 regenerates all objects stored at the provided data source using the provided object format.

FIG. 11B illustrates an example user interface 1120 for allowing a user to perform a cleanup operation on an object store location provided by the user (e.g., object store 115) using a previously trained machine learning model, where the location of the previously trained machine learning model is provided by the user. The model application module 134 of the model provider system 130 may retrieve the machine learning model indicated by the user (e.g., from a model store 140). The model application module 134 may then apply at least one object from the indicated object store location as input to the machine learning model to regenerate the object and create an improved object. This operation is referred to as object store cleanup, and results in an improved set of objects stored by the object store, for example because the regenerated object more closely aligns with the object format on which the machine learning model was trained. In some embodiments, the user may not need to provide a trained model source. In such embodiments, the model provider system 130 may train a machine learning model on the information retrieved from the provided object store location to perform the cleanup operation on the object store 115 (e.g., using the routine 300 described previously herein). The information from the object store 115 may then be provided to the newly trained machine learning model as input, and the output of the machine learning model may replace at least a portion of the object information stored in the object store 115.

FIG. 11C illustrates an example user interface 1130 for allowing a user to regenerate an object with additional information (e.g., a content seed) from a content seed source provided by the user. When the user presses the button 1132, the object and the additional information are provided as input to a machine learning model by the model provider system 130 to regenerate the information in an improved or complete form as a regenerated object, for example by including at least a portion of the information contained in the additional information. In some embodiments, the model provider system 130 may process the additional information to reduce the information content of the content seed to a minimum amount of information required by the machine learning model to generate the object. Such a reduction in the information content of the content seed may reduce duplicate information, and enable for more efficient object generation by the model provider system 130.

Figure 12:
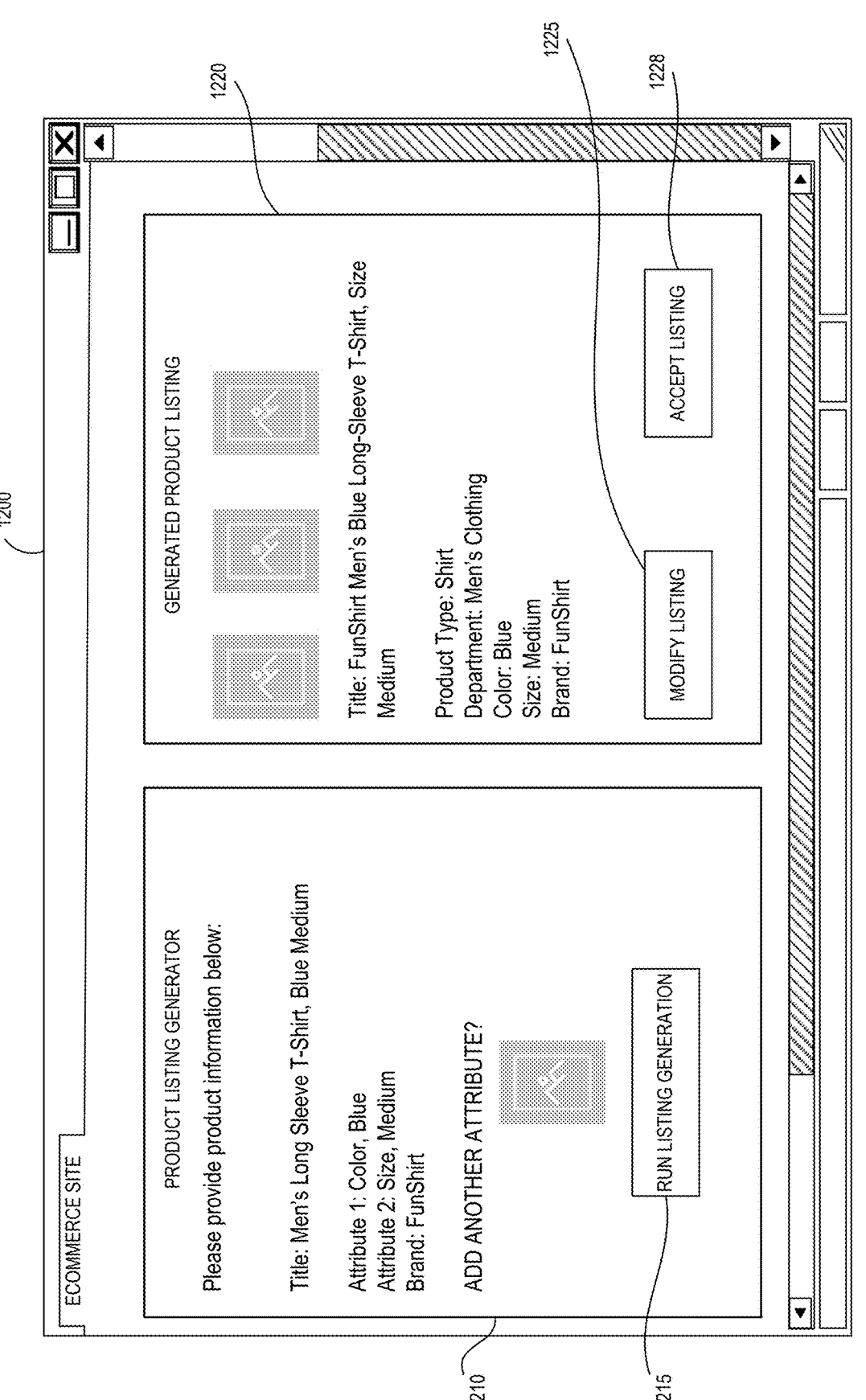
FIG. 12 is an illustrative example of a user interface for providing the automated generation of online retailer listings for a seller according to some embodiments.

FIG. 12 illustrates an example user interface 1200 for allowing a user to generate an item listing for an ecommerce platform. The user interface 1200 includes an information entry portion 1210, and a generated listing display portion 1220.

The information entry portion 1210 of this example allows a user (e.g., a seller or potential seller on the ecommerce platform) to enter item information for an item to be listed on the ecommerce platform. For example, the user may provide a title, attribute information associated with the item, images, audio, video, and/or multimedia. When the user has completed entry of the available item information, the user may select a button 1215 to indicate that the model provider system 130 is to generate the item listing. When the button 1215 has been interacted with by the user, the model application module 134 provides the item information in the information entry portion 1210 as part of an input to a machine learning model which may have been trained to generate item listings for the ecommerce platform. Alternatively, the machine learning model may be generally trained for object generation, and may be provided the item information in the information entry portion 1210 and object format information for the ecommerce site (e.g., an example item listing, a schema, etc.) as input.

When the generated item listing has been received from the model provider system 130, the generated item listing is presented to the user in the generated listing display portion 1220. As shown, the generated item listing may include additional media (e.g., images, video, multimedia, etc.) generated by the model provider system 130, a title, and a structured set of item attributes. While not shown here, the generated listing display portion 1220 may additionally display other item information generated by the model provider system 130 as part of an item listing. For example, the generated item listing may include previous user reviews, a natural language description of the item, a price, or any other item information the machine learning model of the model provider system 130 is trained to generate based on the item listing schema for the ecommerce platform.

Further, the generated listing display portion 1220 may include a button 1225 allowing the user to modify the generated item listing, and a button 1228 allowing the user to accept the generated item listing. If the user interacts with the button 1228 to accept the generated item listing, the generated item listing may be provided to an object store 115 associated with the ecommerce platform used to store item listings. In some embodiments, providing the generated item listing to the object store 115 may cause the item to be listed for sale on the ecommerce platform.

Execution Environment

FIG. 13 illustrates various components of an example model provider system 130 configured to implement various functionality described herein.

In some embodiments, the model provider system 130 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the model provider system 130 may be implemented as web services consumable via one or more communication networks. In further embodiments, the model provider system 130 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a model provider system 130 may include: one or more computer processors 1302, such as physical central processing units ("CPUs"); one or more network interfaces 1304, such as a network interface cards ("NICs"); one or more computer readable medium drives 1306, such as a high density disk ("HDDs"), solid state drives ("SSDs"), flash drives, and/or other persistent non-transitory computer readable media; one or more input/output device interfaces 1308; and one or more computer-readable memories 1310, such as random access memory ("RAM") and/or other volatile non-transitory computer readable media.

The computer-readable memory 1310 may include computer program instructions that one or more computer processors 1302 execute and/or data that the one or more computer processors 1302 use in order to implement one or more embodiments. For example, the computer-readable memory 1310 can store an operating system 1312 to provide general administration of the model provider system 130. As another example, the computer readable memory 1310 can store model training module 132. As another example, the computer-readable memory 1310 can store a model application module 134. As another example, the computer-readable memory 1310 can store a training information modification module 136.

Example Logical Hierarchy

Figure 14:
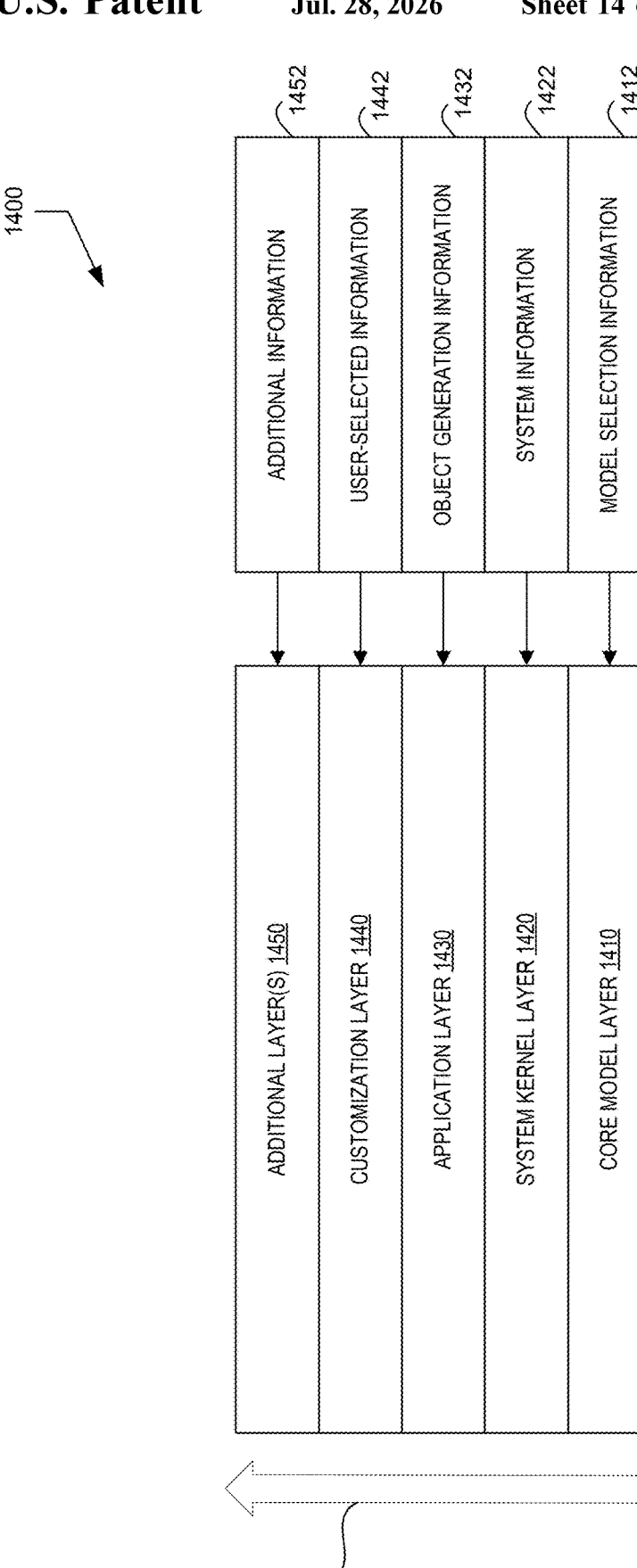
FIG. 14 is a block diagram of an illustrative logical object generation rule hierarchy for user-configurable object generation according to some embodiments.

FIG. 14 illustrates an example of a logical hierarchy 1400 for representing the priority of application of rules by a machine learning model configured to generate an object. The logical hierarchy of this example includes a core model layer 1410, a system kernel layer 1420, an application layer 1430, a customization layer 1440, and one or more additional layers 1450. Additionally, an order of priority is represented by the arrow 1460, with layers closest to the bottom of the hierarchy having a greater priority than layers closest to the top of the hierarchy.

In this example, core model layer 1410 has a greater priority than system kernel layer 1420, and application layer 1430 has a lower priority than both model layer 1410 and system kernel layer 1420. The core model layer 1410 may include rules directed to the selection of a machine learning model to be used in generating an object, a set of weights to be applied to a machine learning model, or a training information system 270 from which training information for the machine learning model should be retrieved prior to generation of an object. For example, a request may indicate that an item listing from a first product catalog is to be used to generate an item listing for a second product catalog. In this example, the model application module 134 may retrieve training information from the training information system 270 used to train a machine learning model 135 to convert item listings from the first product catalog to an item listing format used by the second product catalog. This may allow a large number of item listings for the second product catalog to be more efficiently generated from item listings retrieved from the first product catalog. An example routine for training the machine learning model 135 is described in further detail below in relation to FIG. 3. The system kernel layer 1420 may include rules describing an object format, defining a target system where the object will be used or stored, or additional constraints related to the target system or object format. The application layer 1430 may include rules associated with the application through which a user of the model provider system 130 generates objects. For example, the application layer 1430 may include rules defining an input modality, defining how an input modality is to be processed, describing an acceptable level (if any) of hallucination by a machine learning model, a structure of an input (e.g., a definition of a data structure in which the input information is received), and the like. The customization layer 1440 may include rules associated with customizing the generated object. For example, the rules of the customization layer 1440 may be generated by a user of the model provider system 130, and may include a writing style to be applied to a text portion of a generated object, an image to be included, a portion of the generated object to be removed, additional information to be included in the generated object, brand guidelines associated with a product brand, section guidelines associated with a portion of an e-commerce marketplace, and the like. Additionally, rules in the customization layer 1440 may be generated in an iterative fashion based on feedback received from a user after the user has reviewed a previously generated object, where the rules include feedback from the user intended to be incorporated when regenerating the generated object. The one or more additional layers 1450 includes additional rules having a priority lower than rules associated with earlier layers of the hierarchy. The logical hierarchy 1400 may include any number of additional layers 1450, including no additional layers. Further, while the core model layer 1410, system kernel layer 1420, application layer 1430, and customization layer 1440 are shown and described herein, it should be understood that fewer, additional, and/or alternative layers may be used, and that rules described as being associated with a particular layer may be associated with a different layer depending on the embodiment.

Each layer of the logical hierarchy 1400 may be associated with one or more rules defining an aspect of an object to be generated by the model provider system 130. For example, the core model layer 1410 may be associated with model selection information 1412 indicating a core, or pre-trained, machine learning model to be used in generating a structured object. The model selection information 1412 may indicate a specific machine learning model, for example using an identifier associated with the model, or may indicate a machine learning model generally and a storage location for a set of weights to be applied to the model before generating a structured object. The system kernel layer 1420 may be associated with system information 1422 indicating a format of an object, instructions to cause the generated object to be internally consistent, and the like. The application layer 1430 may be associated with instructions 1432 used to indicate where information for generating a structured object can be retrieved from, such as brand guidelines, an existing object containing relevant information (e.g., a product listing on an ecommerce platform), and object generation instructions (e.g., a preferred number of images). The customization layer 1440 may be associated with user information 1442, such as user feedback provided in response to review of a generated object. The one or more additional layers 1450 may be associated with any additional information or instructions having a lower priority than the preceding layers of the logical hierarchy 1400.

The logical hierarchy 1400 may be stored by the object generation rules store 290 and rules of the object generation rules store 290 may be associated with levels of the logical hierarchy 1400, for example based on metadata associated with each rule. Alternatively, the logical hierarchy 1400 may be implicitly defined by the content or metadata of the rules stored by the object generation rules store 290. For example, a first rule associated with the model layer 1410 may define a model to be used for generating an object, and have no indication of a second rule that should not be violated. A second rule associated with the application layer 1430 may then define a preference for the object defined by the application requesting generation of the object. The second rule may explicitly state that the first rule is not to be violated when applying the second rule. Alternatively, the first rule and the second rule may be associated with metadata indicating each rule's position in the logical hierarchy 1400. The prompt configuration module 138 may then generate prompt information to instruct a machine learning model used to generate the object that the application of the second rule should not cause the object to violate the first rule.

Example Object Generation Routine

Figure 15B:
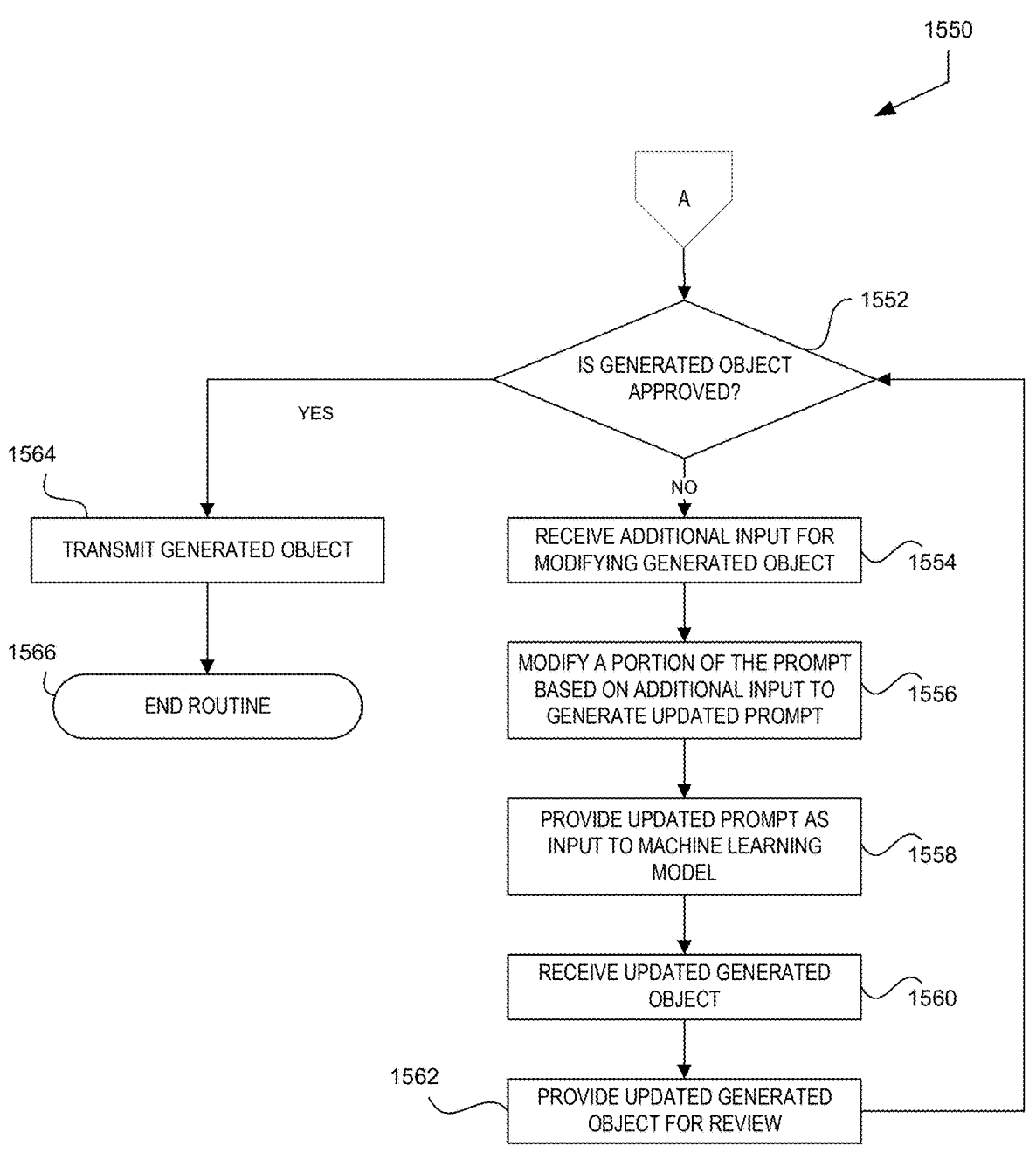
FIG. 15B is a flow diagram of an illustrative routine for generating an object according to some embodiments.

FIGS. 15A and 15B illustrate example routine 1500 and example routine 1550 for generating an object in an object format based on a logical hierarchy of rules for generating the object. The routine 1500 begins at block 1502, for example in response to the model provider system 130 receiving a request from a requesting system 280 to generate an object in an object format. The request may be a natural language request, automated request generated by a computing system, an image, a video, or another type of request received from a user associated with the requesting system 280. For example, the request may be received from a seller using an ecommerce platform, and the request may be to generate an ecommerce listing for an item. In another example, the request may be an automated request received from a database administrator, and the request may be to convert an object from a first database schema to a second database schema. In some embodiments, the request may indicate a target object format according to which the object is to be generated. Alternatively, the model provider system 130 may determine the object format from information provided in the request, for example a target object provider system 110 to which the generated object is requested to be transmitted. Additionally, the request may include one or more rules, for example a user preference for a primary image associated with the generated object. The rules received in the request may be automatically associated with the customization layer 1440. Alternatively, the prompt configuration module 138 may analyze a rule received in the request, for example by comparing the rule to a rule stored in the object generation rules store 290 (e.g., using a machine learning model configured to determine rule similarity), to determine a level of the logical hierarchy 1400 with which the rule should be associated.

At block 1504, the prompt configuration module 138 may prepare a customization layer portion of the prompt based on one or more rules or parameters associated with the customization layer 1440 of the logical hierarchy 1400. Parameters may indicate, for example, a structure of a portion of the object, a preference for a portion of the object, or a requirement for a portion of the object. Preparing the customization layer portion may include the prompt configuration module 138 accessing a rule stored by the object generation rules store 290 associated with the customization layer 1440. Further, the prompt configuration module 138 may add additional information or parameters to the rule. For example, the prompt configuration module 138 may append instructions to the rule indicating that the application of the rule by the machine learning model should not violate a rule of a lower level of the logical hierarchy 1400. In another example, the prompt configuration module 138 may group two or more rules from the customization layer 1440 into the portion (e.g., as a list) where the two or more rules are not given a priority over each other, but are given a lower priority than rules from a preceding layer of the logical hierarchy 1400. In some embodiments, the machine learning model selected to generate the object may have been previously trained to enforce the hierarchy on rules used to generate the object, and the prompt configuration module 138 may append information indicating that the rule is associated with the customization layer 1440 of the logical hierarchy 1400 without having to include explicit instructions to enforce the hierarchy in the portion of the prompt or the prompt generally.

At block 1506, the prompt configuration module 138 may prepare an application layer portion of the prompt based on one or more rules or parameters associated with the application layer 1430 of the logical hierarchy 1400. Preparing the application layer portion may include the prompt configuration module 138 accessing a rule stored by the object generation rules store 290 associated with the application layer 1430. Further, the prompt configuration module 138 may add additional information or instructions to the rule. For example, the prompt configuration module 138 may append instructions to the rule indicating that the application of the rule by the machine learning model should not violate a rule of a lower level of the logical hierarchy 1400. In another example, the prompt configuration module 138 may group two or more rules from the application layer 1430 into the portion (e.g., as a list) where the two or more rules are not given a priority over each other, but are given a higher priority than rules in a subsequent layer of the logical hierarchy 1400 and a lower priority than rules from a preceding layer of the logical hierarchy 1400. In some embodiments, the machine learning model selected to generate the object may have been previously trained to enforce the hierarchy on rules used to generate the object, and the prompt configuration module 138 may append information indicating that the rule is associated with the application layer 1430 of the logical hierarchy 1400 without having to include explicit instructions to enforce the hierarchy in the portion of the prompt or the prompt generally.

At block 1508, the prompt configuration module 138 may prepare a kernel layer portion of the prompt based on one or more rules or parameters associated with the system kernel layer 1420 of the logical hierarchy 1400. Preparing the kernel layer portion may include the prompt configuration module 138 accessing a rule stored by the object generation rules store 290 associated with the system kernel layer 1420. Further, the prompt configuration module 138 may add additional information or instructions to the rule. For example, the prompt configuration module 138 may append instructions to the rule indicating that the application of the rule by the machine learning model should not violate a rule of a preceding level of the logical hierarchy 1400. In another example, the prompt configuration module 138 may group two or more rules from the system kernel layer 1420 into the portion (e.g., as a list) where the two or more rules are not given a priority over each other, but are given a higher priority than rules in a subsequent layer of the logical hierarchy 1400 and a lower priority than rules from a preceding layer of the logical hierarchy 1400. In some embodiments, the machine learning model selected to generate the object may have been previously trained to enforce the hierarchy on rules used to generate the object, and the prompt configuration module 138 may append information indicating that the rule is associated with the system kernel layer 1420 of the logical hierarchy 1400 without having to include explicit instructions to enforce the hierarchy in the portion of the prompt or the prompt generally.

When generating the portions of the prompt as described in blocks 1504-1508, the prompt configuration module 138 may determine a particular set of rules associated with each layer of the logical hierarchy 1400 to access (e.g., from the object generation rules store 290) when generating the associated portion of the prompt. For example, a portion of the prompt may be associated with a level of the logical hierarchy 1400 based on the computing system from which the portion is received (e.g., model provider system 130, requesting system 280, object generation rules store 290, etc.). Alternatively, the portion may be associated with a level of the logical hierarchy 1400 based on a user associated with the portion (e.g., a product seller, a user associated with the model provider system 130, etc.). Further, multiple portions of the prompt may be associated with the same layer of the logical hierarchy 1400, and therefore do not take priority over each other. In such cases, the multiple portions may all be indicated as associated with the layer (e.g., system kernel layer 1420, application layer 1430, etc.) without the need to indicate where the portion originated. For example, an application may provide a graphical user interface to a product seller to allow the product seller to generate a product listing. The product seller may provide instructions to access a previous product listing for the same product on a website. The application may then perform additional searching and identify the same product for sale on a second website. Each website may be provided as a source of information, and be associated with the application layer 1430 of the logical hierarchy 1400, such that both websites have a same priority for the information retrieved. In another example, a product seller may include an instruction to prioritize information about a color of a couch for which a product listing will be generated. This instruction may be associated with the customization layer 1440. A second user associated with the brand of the couch may have provided a second instruction to highlight the number of people that can be seated on the couch in the product listing. This second instruction may also be associated with the customization layer 1440. Each instruction may then be provided as input to the machine learning model 135 and associated with the customization layer 1440. The machine learning model 135 may then attach a same priority to following the first and the second instruction.

To allow the machine learning model 135 to associate portions of the prompt with levels of the logical hierarchy 1400, the prompt configuration module 138 or model application module 134 may provide additional information, or add metadata to the prompt indicating that a portion is associated with a layer of the logical hierarchy 1400. For example, the additional information may be a text label for each portion of the prompt indicating a layer of the logical hierarchy 1400 with which the portion is associated. In another example, the prompt configuration module 138 may attach metadata to an image included in the prompt indicating the layer of the logical hierarchy 1400 with which the image should be associated. In some embodiments, at least one portion of the prompt may not indicate the layer of the logical hierarchy 1400 with which the portion is associated. In such embodiments, the machine learning model 135 may determine the layer of the logical hierarchy 1400 associated with the portion of the prompt. For example, the machine learning model 135 may be trained to associate certain instructions or parameters with a layer of the logical hierarchy 1400 (e.g., the machine learning model 135 may be trained to determine that parameters indicating a machine learning model to be used are associated with the model layer 1410).

In some embodiments, the machine learning model 135 may be trained to determine that a portion of a prompt is associated with a layer of the logical hierarchy 1400 based on analyzing the prompt to identify instructions or parameters that are associated with a particular layer. Analyzing the prompt may be performed as part of the object generation routine (e.g., routine 1500), or separately before the prompt is used to generate the object (e.g., by labelling the prompt to generate a labelled prompt that is then provided as input to generate the object).

At block 1510, the prompt configuration module 138 may combine the portions of the prompt into a prompt to cause a machine learning model to generate an object in an object format. In some embodiments, additional portions of the prompt may be generated, for example, a portion associated with the model layer 1410, or one or more portions of the prompt each associated with one or more additional layers

1450. The prompt configuration module 138 may combine these additional portions into the prompt. Further, in some embodiments, a rule associated with the model layer 1410 or system kernel layer 1420 may indicate a machine learning model, set of weights for a neural network, or other configuration information (e.g., training information for the machine learning model) that will be used to generate the object. In such embodiments, the rule associated with the model layer 1410 or the system kernel layer 1420 may not be included in the prompt, and the model application module 134 may use the information in the rule to configure the machine learning model 135 prior to the model application module 134 causing the machine learning model 135 to generate the object. Additionally, a rule may indicate additional information to be used in the generation of the object, for example information stored by an information provider system 260. The model application module 134 may then access the information indicated by the rule in block 1512 described below.

At block 1512, the model application module 134 may access additional information for generating the object, for example as described previously herein with respect to block 506 of the routine 500. The prompt configuration module 138 may then combine the additional information with the prompt generated at block 1510 to update the prompt for input to the machine learning model.

At block 1514, the prompt configuration module 138 provides the prompt to the model application module 134 to provide as input to the machine learning model 135. The prompt is configured to cause the machine learning model to generate the object in the object format according to the rules associated with layers of the hierarchy 1400. When generating the object, the machine learning model will avoid violating a rule in a preceding layer of the hierarchy 1400 when attempting to conform to a rule from a subsequent layer of the hierarchy 1400. For example, when attempting to follow a rule associated with the customization layer 1440 the machine learning model, based on the prompt, will not violate a rule associated with the system kernel layer 1420. Alternatively, the machine learning model may be trained to enforce the hierarchy of rules, and so may prevent the violation of a rule in a preceding layer of the logical hierarchy 1400 based on applying a rule in a subsequent layer of the logical hierarchy 1400 without the inclusion of explicit instructions, or a description of the hierarchy, in the prompt. Further, providing the prompt to the machine learning model may include causing the model application module 134 to access a selected machine learning model from the model store 140, such as a machine learning model trained to enforce a hierarchy where rules for generating the object are associated with levels of the hierarchy either implicitly (e.g., the machine learning model 135 understands which rules are associated with respective levels of the logical hierarchy 1400 based on training of the machine learning model 135) or explicitly (e.g., the prompt configuration module 138 associates each rule with a level of the logical hierarchy 1400 in the prompt).

At block 1516, the model application module 134 receives the generated object from the machine learning model (e.g., machine learning model 135). Further, as described in relation to block 512 of FIG. 5 previously herein, the machine learning model 135 may generate the generated object in a single pass, where the generated object is an internally consistent object. Additionally, the machine learning model 135 may provide additional information, such as a source of the information used to generate a portion of the generated object, an indication that a portion of the generated object was inferred from latent knowledge of the machine learning model, a confidence score indicating a confidence of the machine learning model that the generated object was correctly generated, an indication of an attribute in which the generated object that the machine learning model has a low confidence, and the like. The model application module 134 may then provide such additional information to the model provider system 130. Further, the machine learning model of the model application module 134 may receive retrieved information from a plurality of information sources, which may store information in different formats. The retrieved information may also include conflicting information from different information sources (e.g., a first information source may provide a first value for the size of a shirt, and the second information source may provide a second value for the size of the shirt). The machine learning model may then reconcile the conflicting information as part of generating the requested object. When the machine learning model has generated the object, the model application module 134 receives the generated object.

At block 1518, the model provider system 130 may provide the generated object for review. The model provider system 130 may provide the generated object for review by transmitting the generated object to a requesting system 280, or to a storage system for retrieval by the requesting system 280 at a later time. Providing the generated object for review may include providing graphical user interface information, for example presenting the generated object in a portion of the graphical user interface, providing a mechanism for the user to provide feedback (e.g., allowing the user to provide a description of a change to be made in a modality, an upload of additional information, a pointer to another location where additional information is located such as a URL or storage system identifier, directly modify the object through interaction with the graphical user interface, etc.).

Decision block 1552 of routine 1550 continues from block 1518 of routine 1500. At decision block 1552, the model provider system 130 may determine whether the generated object has been approved. For example, the model provider system 130 may receive an indication from the requesting system 280 that indicates whether the generated object has been approved or rejected.

At block 1554, the model provider system 130 may receive additional input for modifying the generated object. The additional input may be instructions received by the model provider system 130 describing changes to be made to the generated object. In some embodiments, the indication received at decision block 1552 may also include feedback from a user of the requesting system 280 indicating a reason for rejecting the generated object. For example, the feedback may note an issue with the title that should be resolved (e.g., an indication the title is too long), an issue with the description (e.g., the description is difficult to understand), and the like. The feedback may be text written in plain language, an automated message generated by a computing system, an image, audio containing verbal feedback, or any other medium in which feedback can be provided. The feedback may include feedback for multiple elements of the generated object (e.g., feedback on the title and an image of the object). In some embodiments, the model provider system 130 may parse the additional input to identify the types of feedback received (e.g., feedback related to a title, a description, an image, an ordered list, etc.). Further, the model provider system 130 may parse the additional input to determine whether additional information should be retrieved, for example from an information provider system 260.

At block 1556, the prompt configuration module 138 may modify at least a portion of the prompt for the machine learning model 135 based on the additional input to generate an updated prompt. The prompt configuration module 138 may modify the entire prompt (e.g., by generating an entirely new prompt), or only a portion of the prompt, depending on the additional input received. Modifying the prompt may include, for example, removing a portion of the prompt, adding additional information to the prompt, replacing a portion of the prompt, and the like. Further, the prompt configuration module 138 may maintain a history of the previous prompts provided as input to the model application module 134. The prompt configuration module 138 may append at least a portion of a previous prompt, or an indication of how a previous prompt was modified, to the modified prompt.

At block 1558, the prompt configuration module 138 may provide the updated prompt to the model application module 134 to be applied as input to a machine learning model 135. In some embodiments, the machine learning model that receives the updated prompt may be a different machine learning model from the machine learning model that generated a previous version of the generated object. Providing the updated prompt to the model application module 134 as input to the machine learning model causes the machine learning model to generate an updated generated object.

At block 1560, the model application module 134 may receive the updated generated object from the machine learning model 135 as described previously with respect to block 512 of routine 500 or block 1516 of routine 1500.

At block 1562, the model provider system 130 may provide the updated generated object for further review. For example, the model provider system 130 may provide the updated generated object for review as described previously herein in relation to block 1518 of routine 1500.

At block 1564, the model provider system 130 transmits the generated object. For example, the model provider system 130 may transmit the object as described previously in relation to block 514 of FIG. 5. When the model provider system 130 has transmitted the generated object, the routine 1550 moves to block 1566 and ends.

As noted previously herein, portions of the routine 1550 may be performed in a different order, in parallel, or may be omitted. For example, block 1504, block 1506, and block 1508 may be performed in parallel such that all portions of the machine learning model prompt are generated substantially in parallel. Additionally, while a certain order of the portions of the machine learning model prompt may be described in the example routine 1500, the portions of the prompt may be combined in different orders (e.g., a model layer prompt portion may be followed by the kernel layer prompt portion, the application layer prompt portion, and the customization layer prompt portion respectively). The order of the portions of the prompt may be based on the order of the hierarchy. Alternatively, the combination of the portions of the machine learning model prompt may have no order, and the machine learning model may identify a layer of the hierarchy associated with a portion of the prompt based on the portion of the prompt, metadata associated with the portion, or the prompt including an additional indication indicating that a portion of the prompt is associated with a layer of the hierarchy (e.g., as show in the prompt 1600 of FIG. 16 below). Further, in some embodiments, the routine 1500 may proceed directly to block 1564 without requiring approval of the generated object. Additionally, where the routine 1500 and routine 1550 are performed repeatedly, portions of a prompt generated in a prior operation of the routine 1500 may be used in a later operation of the routine 1500. For example, where multiple items listed in an online product catalog are to be converted to a format of a second online product catalog by generating product listing objects for the second online product catalog, a portion of the prompt related to a layer of the hierarchy that is not changed when generating product catalog objects may be stored and used repeatedly, thereby removing the need to perform at least one of block 1504, block 1506, or block 1508 in subsequent operations of the routine 1500.

Example Object Generation Prompt Chain

FIG. 16 illustrates an example of a prompt 1600 represented as a prompt chain and arranged to cause a machine learning model to generate an object according to an object format, and allowing for additional customization of the object (e.g., based on instructions received from a requesting system 280) while preventing violation of the object format based on any of the instructions related to the additional customization. As shown, the prompt 1600 includes a model layer 1410 instruction, indicated by the <Model> tag, and referencing the machine learning model identifier of the machine learning model to be used to generate an object based on the prompt 1600. The prompt 1600 further includes a system kernel layer 1420 instruction, indicated by the <System Kernel> tag, describing the type of object to be generated and the fundamental requirements of the generated object (e.g., title length, internal consistency, roast_level value). The prompt 1600 also includes an application layer 1430 instruction, indicated by the <Application> tag, including an instruction to access a pre-existing product listing located at a URL. The application layer 1430 instruction may be received from an application used by a user, for example via an interface shown in FIGS. 11A-11C and 12. For example, the prompt 1600 includes the URL where an existing product listing is located, which may have been received by the prompt configuration module 138 via the user interface 1110 of FIG. 11A operating on a requesting system 280. Finally, the prompt includes a customization layer 1440 instructions, indicated by the <Customization> tag, including further instructions for generating the object. For example, the customization layer 1440 instructions may have been received from the user interface 1200 of FIG. 12 running on a requesting system 280. The prompt configuration module 138 may then have parsed the information received from the requesting system 280 to generate the customization layer 1440 instructions. While the example prompt 1600 here only includes instructions not to violate preceding layer instructions only in the customization layer 1440 instructions, such instructions may be included in each layer following the model layer 1410, or may be written in a different manner (e.g., the system kernel layer 1420 instructions may include the text "these instructions should be given the highest priority and should not be violated by any subsequent instructions"). Alternatively, the machine learning model 135 that will generate the object based on the prompt 1600 may have been previously trained to understand the logical hierarchy 1400 and to avoid violating rules of a layer of the logical hierarchy 1400 based on instructions associated with a subsequent layer.

Example Model Training Routine

FIG. 17 illustrates example routine 1700 for training a machine learning model to generate objects according to an object format. Advantageously, the example routine 1700 for training the machine learning model may be achieved using self-supervised learning methods, improving the efficiency of training the machine learning model by reducing the need for human involvement (e.g., labelling of data, direct feedback, etc.). During the routine 1700 conflicts between instructions associated with different layers of a hierarchy (e.g., hierarchy 1400) are automatically created, resulting in additional training data for use in training the machine learning model. These and other advantages of the routine 1700 lead to a scalable training process for a machine learning model and produces a machine learning model trained to prioritize instructions based on an associated layer of the hierarchy while ignoring conflicting instructions. In contrast to the example training routing 300 described above herein where noise is added to training data, in the routine 1700 conflicts between instructions (e.g., misaligned instructions) associated with different layers of the hierarchy are intentionally generated in the training data, and the misaligned instructions may be specific to the hierarchy.

The routine 1700 begins at block 1702, for example in response to a request from a requesting system 280. For example, the request may be a natural language request from a user, provided via a user interface, which indicates a machine learning model is to be trained to generate objects according to an object format based on instructions associated with layers of a hierarchy (e.g., logical hierarchy 1400) of instructions. In another example, the request may be to train a machine learning model to generate objects according to a provided object format (e.g., provided as a portion of an input to the machine learning model) in a zero-shot object generation arrangement, where the instructions to generate the object are associated with layers of a hierarchy, and where following instructions in a layer of the hierarchy should not cause the model to violate instructions in a preceding layer of the hierarchy. It should be understood that while reference is made to training a machine learning model, the routine 1700 may be used to modify a previously trained machine learning model (e.g., by re-training or fine-tuning the previously trained machine learning model) to perform object generation.

At block 1704, the model provider system 130 retrieves training data to train the machine learning model from a training information system 270 (e.g., the object provider system 110 of FIG. 1). For example, the model provider system 130 may transmit a training data request (e.g., using an application programming interface) to an object provider system 110. The training data request may be based in part on the request received from the requesting system 280 to perform training of a machine learning model of the model provider system 130. For example, the request may indicate an instruction format for which the machine learning model is to be trained, which may include a structure of a hierarchy, and the model provider system 130 may then generate a training data request for instructions in the indicated instruction format.

In some embodiments, the model provider system 130 may retrieve instructions individually to be provided to the machine learning model for training. Alternatively, the model provider system 130 may retrieve a plurality of sets of instructions in the instruction format (e.g., a set of instructions associated with a same logical hierarchy 1400), and store the plurality of sets of instructions temporarily for use in training the machine learning model.

At block 1706, the training information modification module 136 of the model provider system 130 misaligns instructions in the retrieved training data to generate modified training data. Misaligning instructions may include altering instructions in the retrieved training data such that following an instruction associated with a layer of the logical hierarchy 1400 (e.g., application layer 1430) would cause the generated object to violate a rule of a preceding layer of the logical hierarchy 1400 having a higher priority (e.g., system kernel layer 1420 relative to application layer 1430). Generating modified training data through misalignment allows for the generation of additional training data from the retrieved training data. Advantageously, where limited training data is available to be retrieved, the additional training data may allow for improved training of the machine learning mode compared to systems where modified training data is not generated. Further, the use of modified training data to train the machine learning may reduce or eliminate the need for manual labelling of training data, improving the efficiency of training the machine learning model.

Different types of misaligned instructions may be generated in the training data by the training information modification module 136. For example, an instruction from a first layer of the hierarchy may be identified, and a conflicting instruction may be generated and associated with a second layer of the hierarchy having a lower priority than the first layer. In another example, an instruction from a first layer of the hierarchy may be identified, and a conflicting instruction may be generated and associated with a second layer of the hierarchy having a higher priority than the first layer. These different types of misaligned instructions may improve the ability of the machine learning model, following training, to correctly prioritize instructions having a higher priority over conflicting instructions having a lower priority (e.g., based on the layer of the hierarchy associated with the instructions).

In some embodiments, the retrieved training data may have previously been generated through misalignment of instructions, a sufficient amount of training data may have been retrieved such that generating additional training data through misalignment is not necessary, or misalignment of the training data may be otherwise determined to be undesirable or unnecessary, and block 306 may be omitted.

At block 1708, the model training module 132 of the model provider system 130 provides the modified training data as input to a machine learning model to be trained. Providing the training data as input to the machine learning model may cause the machine learning model to generate an output, which may be stored by the model provider system 130.

At block 1710, the model training module 132 compares the output of the machine learning model to the original training data. The result of the comparison may be a measure of the accuracy of the machine learning model in enforcing the logical hierarchy 1400 in the application of the instructions in the training data to generate an object.

At block 1712, the model training module 132 modifies the machine learning model based on the result of the comparison at block 1710. In some embodiments, the machine learning model may be untrained, and the result of the model training module 132 modifying the machine learning model is a trained machine learning model. In alternative embodiments, the machine learning model may have previously been trained, for example as a large language model trained on a large corpus of text. The previous training may be related to the purpose for which the machine learning model is being modified herein (e.g., object generation). Alternatively, the previous training may be unrelated to the purpose for which the machine learning model is being modified herein. Modifying the machine learning model may include, for example, adjusting one or more weights connecting nodes of a neural network, modifying an encoder used to represent input data in an embedding space, or any other modification of a machine learning model known to be used during a machine learning model training process. Further, after modifying the machine learning model, a validation step may occur in order to determine whether additional training of the machine learning model is required. For example, one or more validation objects may be provided as input to the machine learning model and compared to an expected output (e.g., a ground truth dataset), and a threshold accuracy, or other target value, may be used to determine whether the machine learning model training is complete. When additional training of the machine learning model is required, at least one of the previously described blocks of the routine 1700 may be repeated. Such repeated blocks may be repeated serially, or in parallel, for at least a portion of the retrieved training data.

At block 1714, the model provider system 130 stores the trained machine learning model for later use. For example, the model provider system 130 may store the machine learning model in a model store 140. When storing the trained machine learning model, the model provider system 130 may include metadata associated with the trained machine learning model. For example, the metadata may indicate a type of training performed on the trained machine learning model, a training information system 270 or object store 115 from which training data was obtained to train the machine learning model, a hierarchy of instructions which the machine learning model was trained to enforce, an object format for which the machine learning model is trained to generate objects, and the like. When the model provider system 130 has stored the machine learning model, the routine 1700 moves to block 1716 and ends. In some embodiments, a machine learning model may be trained using aspects of the routine 300 and routine 1700.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory comprising a machine learning model; and
   one or more processors in communication with the computer-readable memory, wherein computer-executable instructions, when executed by the one or more processors, cause the one or more processors to at least:
   receive a request to generate a product catalog object of a first object type of a plurality of object types;

generate, based on the request, a first portion of a
machine learning model prompt, wherein the first
portion comprises a first set of parameters for gen-
erating the product catalog object, and wherein the
first portion is generated based on a first layer of a
hierarchy, the first layer comprising rules for format-
ting product catalog objects of the first object type;
generate, based on the request, a second portion of the
machine learning model prompt, wherein the second
portion comprises a second set of parameters for
generating the product catalog object, wherein the
second portion is associated with a second layer of
the hierarchy, the second layer comprising rules for
customizing product catalog objects of the first
object type, wherein the second layer has a lower
priority than the first layer;
combine the first portion and the second portion to
generate the machine learning model prompt;
generate the product catalog object based in part on
providing the machine learning model prompt as
input to the machine learning model, wherein the
product catalog object is formatted according to the
rules for formatting product catalog objects of the
first object type such that the product catalog object
is internally consistent, and wherein to generate the
product catalog object the machine learning model
prioritizes the first set of parameters over conflicting
parameters of the second set of parameters; and
store the product catalog object in a data store.

2. The system of claim 1, wherein the request identifies an
object format for the product catalog object.

3. The system of claim 1, wherein further instructions,
when executed by the one or more processors, cause the one
or more processors to at least:
generate, based on the request, a third portion of the
machine learning model prompt, wherein the third
portion comprises a third set of parameters for gener-
ating the product catalog object, wherein the third
portion is associated with a third layer of the hierarchy,
the third layer comprising rules for customizing prod-
uct catalog objects of the first object type, wherein the
third layer has a higher priority than the second layer,
and wherein the third layer has a lower priority than the
first layer, and
wherein to generate the product catalog object the
machine learning model prioritizes the first set of
parameters over conflicting parameters of the third set
of parameters, and wherein to generate the product
catalog object the machine learning model prioritizes
the third set of parameters over conflicting parameters
of the second set of parameters.

4. The system of claim 1, wherein the second portion of
the machine learning model prompt comprises instructions
to prioritize rules associated with the first layer of the
hierarchy over conflicting parameters of a subsequent layer
of the hierarchy.

5. The system of claim 1, wherein the machine learning
model is trained to prioritize instructions associated with a
layer of the hierarchy over instructions associated with a
relatively lower priority layer of the hierarchy.

6. A computer-implemented method comprising:
under control of a computing device comprising one or
more processors configured to execute specific instruc-
tions,
receiving, from a requesting system, a request to gen-
erate an object;

determining, based on the request, a first portion of a
prompt, wherein the first portion is associated with a
first set of parameters for generation of the object;
determining, based on the request, a second portion of
the prompt, wherein the second portion is associated
with a second set of parameters for generation of the
object, and wherein the first set of parameters takes
priority over the second set of parameters;
generating the object based in part on providing the first
portion and the second portion as input to a machine
learning model, wherein when generating the object,
the machine learning model prioritizes the first set of
parameters over conflicting parameters of the second
set of parameters based in part on a hierarchy,
wherein the first portion is associated with a first
layer of the hierarchy, and wherein the second por-
tion is associated with a second layer of the hierarchy
subsequent to the first layer of the hierarchy, and
wherein the object is formatted according to an
object format, and wherein the object is internally
consistent; and
transmitting, to the requesting system, the object.

7. The computer-implemented method of claim 6,
wherein the object is generated in a single pass of the
machine learning model, and wherein to generate the object
in a single pass the prompt is provided to the machine
learning model resulting in an output through a single unit
of execution of the machine learning model without the
machine learning model retaining a previous input.

8. The computer-implemented method of claim 6,
wherein the hierarchy comprises a plurality of layers, each
layer subsequent a first layer having a priority lower than all
preceding layers of the hierarchy.

9. The computer-implemented method of claim 8,
wherein the request indicates a first portion of the request is
associated with the first layer, and a second portion of the
request is associated with the second layer, and wherein the
request further comprises the hierarchy.

10. The computer-implemented method of claim 8,
wherein the machine learning model is configured to gen-
erate the object in accordance with an instruction associated
with a layer of the hierarchy based on a second instruction
associated with a subsequent layer of the hierarchy in
conflict with the instruction.

11. The computer-implemented method of claim 6 further
comprising:
receiving, from the requesting system, feedback compris-
ing an additional instruction associated with a third
level of the hierarchy subsequent to the second layer of
the hierarchy and subsequent to the first layer of the
hierarchy;
generating a second object based in part on providing the
first portion, the second portion, and the additional
instruction as input to the machine learning model,
wherein when generating the object the machine learn-
ing model does not violate an instruction associated
with the first portion based on an instruction associated
with the second portion or the additional instruction,
wherein when generating the object the machine learn-
ing model does not violate an instruction associated
with the second portion based on the additional instruc-
tion, wherein the object is formatted according to the
object format, and wherein the object is internally
consistent; and
transmitting, to the requesting system, the second object.

12. The computer-implemented method of claim 6,
wherein the first portion of the prompt is associated with a brand guideline, wherein the second portion of the prompt is associated with a user associated with the requesting system, wherein the prompt further comprises a third portion having a priority higher than the first portion, wherein the third portion is associated with a provider of an object generation system, and wherein the third portion comprises parameters to cause the object generated by the machine learning model to be internally consistent.

13. A system comprising:

computer-readable memory; and one or more processors in communication with the computer-readable memory, wherein computer-executable instructions, when executed by the one or more processors, cause the one or more processors to at least:

receive, from a requesting system, a request to generate an object;

determine, based on the request, a first portion of a prompt, wherein the first portion is associated with a first set of parameters for generation of the object;

determine, based on the request, a second portion of the prompt, wherein the second portion is associated with a second set of parameters for generation of the object, and wherein the first set of parameters takes priority over the second set of parameters;

generate the object based in part on providing the first portion and the second portion as input to a machine learning model, wherein when generating the object, the machine learning model prioritizes the first set of parameters over conflicting parameters of the second set of parameters, wherein the object is formatted according to an object format, wherein the object is generated in a single pass of the machine learning model, wherein to generate the object in a single pass an input is provided to the machine learning model resulting in an output through a single unit of execution of the machine learning model without the machine learning model retaining a previous input, and wherein the object is internally consistent; and transmit, to the requesting system, the object.

14. The system of claim 13, wherein the request comprises the object format.

15. The system of claim 13, wherein the first portion comprises text information and image information, and wherein the second portion comprises text information.

16. The system of claim 13, wherein the machine learning model is at least one of: a multimodal model, or a large language model, and wherein the machine learning model has been trained to generate objects in the object format.

17. The system of claim 13, wherein the computer-executable instructions, when executed by the one or more processors, further cause the one or more processors to:

retrieve training data comprising a plurality of sets of instructions;

identify a first set of instructions of the plurality of sets of instructions to be modified, wherein the first set of instructions comprises a plurality of instructions;

based at least in part on a hierarchy comprising a plurality of layers, modify a first instruction of the plurality of instructions associated with a first layer of the hierarchy, wherein modifying the first instruction causes the first instruction to be misaligned with a second instruction of the plurality of instructions associated with a second layer of the hierarchy causing a conflict between instructions associated with the first layer of the hierarchy and instructions associated with the second layer of the hierarchy, and wherein the second layer of the hierarchy has a higher priority than the first layer of the hierarchy; and train the machine learning model using the plurality of sets of instructions.

18. The system of claim 13, wherein the machine learning model is trained to determine that the second set of parameters associated with the second portion of the prompt has a lower priority than the first set of parameters associated with the first portion, and wherein prioritizing the first set of parameters over conflicting parameters of the second set of parameters is based on the second set of parameters associated with the second portion having the lower priority than the first set of parameters associated with the first portion.

* * * * *